United States Patent [19]

Toda et al.

[11] Patent Number: 4,851,994
[45] Date of Patent: Jul. 25, 1989

[54] DATA I/O TERMINAL EQUIPMENT HAVING MODE SETTING FUNCTIONS FOR DOWNLOADING VARIOUS SPECIFIED APPLICATION PROGRAMS FROM A HOST COMPUTER

[75] Inventors: Tadahiro Toda, Nara; Souichi Ohnishi, Yao; Kensaku Komai, Yamatokouriyama; Masuo Sugihara, Nara, all of Japan

[73] Assignee: Sharp Kabushiki Kaisha, Osaka, Japan

[21] Appl. No.: 761,425

[22] Filed: Aug. 1, 1985

[30] Foreign Application Priority Data

| Aug. 3, 1984 | [JP] | Japan | 59-161942 |
| Aug. 3, 1984 | [JP] | Japan | 59-161943 |
| Aug. 3, 1984 | [JP] | Japan | 59-161944 |
| Aug. 3, 1984 | [JP] | Japan | 59-161945 |
| Aug. 3, 1984 | [JP] | Japan | 59-161946 |
| Aug. 3, 1984 | [JP] | Japan | 59-161947 |
| Aug. 3, 1984 | [JP] | Japan | 59-161948 |
| Aug. 3, 1984 | [JP] | Japan | 59-161949 |
| Aug. 3, 1984 | [JP] | Japan | 59-161950 |
| Aug. 3, 1984 | [JP] | Japan | 59-161951 |
| Aug. 3, 1984 | [JP] | Japan | 59-161952 |

[51] Int. Cl.[4] ............ G06F 3/02; G06F 9/06; G06F 9/24; G06F 9/44
[52] U.S. Cl. .................. 364/200; 364/900; 364/401
[58] Field of Search ... 364/200 MS File, 900 MS File, 364/401, 403, 404, 405; 235/379, 380, 381

[56] References Cited

U.S. PATENT DOCUMENTS

| Re. 30,785 | 10/1981 | Lovercheck et al. | 364/200 |
| 4,107,784 | 8/1978 | Van Bemmelen | 364/900 |
| 4,138,718 | 2/1979 | Toke et al. | 364/200 |
| 4,186,438 | 1/1980 | Benson et al. | 364/200 |
| 4,231,105 | 10/1980 | Schuller et al. | 364/900 |
| 4,253,157 | 8/1981 | Kirschner et al. | 364/900 |
| 4,296,476 | 10/1981 | Mayer et al. | 364/900 |
| 4,345,315 | 8/1982 | Cadotte et al. | 364/900 |
| 4,398,250 | 8/1983 | Hosono | 364/404 |
| 4,403,303 | 11/1983 | Howes et al. | 364/900 |
| 4,468,750 | 8/1984 | Chamoff et al. | 364/900 |
| 4,511,970 | 4/1985 | Okano et al. | 364/401 |
| 4,516,200 | 5/1985 | Thompson | 364/200 |
| 4,547,851 | 10/1985 | Kurland | 364/401 |
| 4,553,202 | 11/1985 | Trufyn | 364/200 |
| 4,553,222 | 11/1985 | Kurland et al. | 364/900 |
| 4,620,273 | 10/1986 | Mitani et al. | 364/136 |
| 4,623,964 | 11/1986 | Getz et al. | 364/401 |
| 4,626,986 | 12/1986 | Mori | 364/200 |
| 4,636,947 | 1/1987 | Ward | 364/200 |
| 4,648,037 | 3/1987 | Valentino | 364/408 |
| 4,665,501 | 5/1987 | Saldin et al. | 364/900 |
| 4,688,173 | 8/1987 | Mitarai et al. | 364/405 |

OTHER PUBLICATIONS

Okada et al. "A New Intelligent Terminal for Clinical Computer Network", Medical & Biological Engineering & Computing, vol. 19, No. 3, May 1981, pp. 257-261.

William S. Holderby, "Current Techniques in Factory Data Collection", Computer Design; vol. 19, No. 12, Dec. 1980, pp. 92-100.

Primary Examiner—Archie E. Williams, Jr.
Assistant Examiner—Danh T. Phung
Attorney, Agent, or Firm—Birch, Stewart, Kolasch & Birch

[57] ABSTRACT

In the present invention, data input/output equipment is connected in communication with a host machine which provides a plurality of service application programs by designating system parameters of one or more common programs. A mode setting feature designates at least a program setting mode and an execution mode. A program RAM stores at least one common program being loaded from the host machine. A parameter setting feature designates parameters included in the common program loaded in the program setting mode to define a plurality of application programs, each of which is available for a specified service. A parameter RAM memorizes the designated parameters. An entry data RAM memorizes entry data, and a service selecting feature designates one of the application programs in the execution mode.

14 Claims, 33 Drawing Sheets

| D | E | F |   | CE |
|---|---|---|---|----|
| A | B | C |   |    |
| 7 | 8 | 9 |   |    |
| 4 | 5 | 6 |   |    |
| 1 | 2 | 3 |   |    |
| O |   | FK1 | FK2 | FK3 |

Fig. 9

| Initial Registration Record | Service Identification Record | Heading Record (H) | Detail Record 1 (D) | Detail Record 2 (D) | ----- | Detail Record n (D) | Footing Record (F) |
|---|---|---|---|---|---|---|---|

⎫ One Data Entry Operation

Fig. 10

| Item 1 | Item 2 | ----- | Item n |
|---|---|---|---|

⎫ 1 Record

Fig. 18
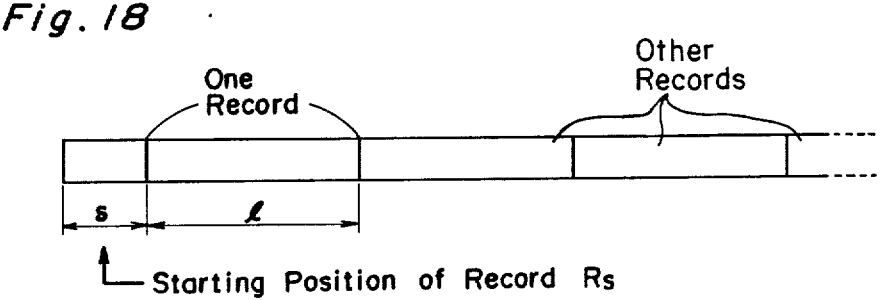
Fig. 19
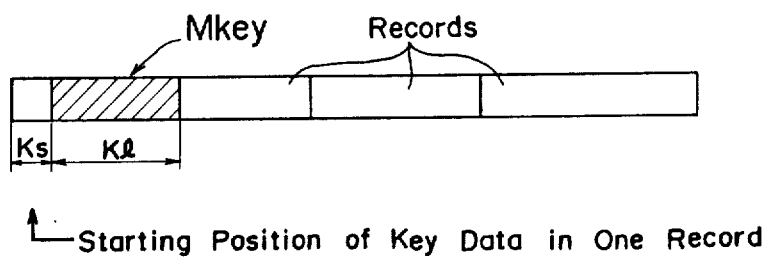
Fig. 20    Master Data Display
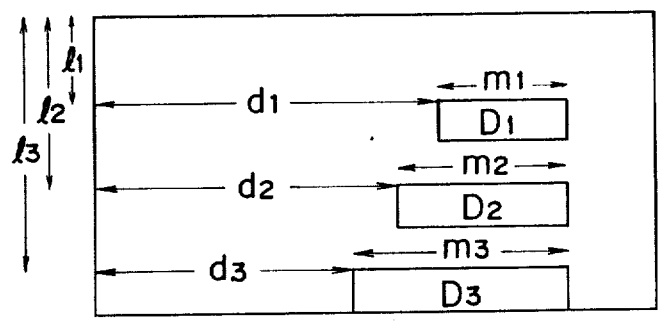
$D_n$ = Data
$M_n$ = Data length
$d_n$ = Data display beginning digit
$l_n$ = Data display line number

DATA I/O TERMINAL EQUIPMENT HAVING MODE SETTING FUNCTIONS FOR DOWNLOADING VARIOUS SPECIFIED APPLICATION PROGRAMS FROM A HOST COMPUTER

FIELD OF THE INVENTION

The present invention relates to data input/output terminal equipment which is connected to a host machine (host-computer) communicably wherein at least one program stored in the host machine is loaded prior to data input/output and data are input and/or output under the control of the loaded program.

BACKGROUND OF THE INVENTION

Conventionally, portable data input/output terminal equipment suitable for controlling the stock, checking load/unload of goods or the like has been on the market.

However, the conventional data input/output terminal equipment is developed only for exclusive use in which application programs thereof are so designated as to be adapted for a specified category of business and for business usage therein.

Thus, application programs have to be designed according to every specified category of business such as a transportation service, a wholesale business etc. and, even in the same specified category of business, according to every service such as receipt service of goods, shipping service of goods etc. Accordingly, even in the same category of business, a variety of terminal equipment is provided for every service thereof. This causes an increase in the number of equipment and leads to possible misuse among them and a lower utility thereof.

SUMMARY OF THE INVENTION

An essential object of the present invention is to provide data input/output terminal equipment being applicable to any category of business and further, being applicable to many services belonging to the category of the selected business.

To this end, data input/output terminal equipment is provided, as is schematically shown in FIG. 1. A data input/output terminal EOST is connected to a host machine HM communicably which is comprised of a mode setting unit A for designating at least a program setting mode and an execution mode, a RAM B for storing at least one basic program being loaded from the host machine, a parameter setting unit C for designating parameters included in the basic program loaded in the program setting mode to define a plurality of application programs with each available for a specified service, a RAM D for memorizing parameters designated, a RAM E for memorizing entry data, and a service selecting unit F for designating one of the application programs in the execution mode.

According to the present invention, it becomes possible to make a plurality of service application programs by designating system parameters included in one or more basic or common programs so as to adapt programs for the specified category of business and for each service thereof.

In the program setting mode, a variety of functions are selectably designated and set appropriately according to the kind of category of business, the type of service to be done thereabout and the custom of trade regarding thereto etc.

BRIEF DESCRIPTION OF THE DRAWINGS

The present invention will now be described more in detail by way of examples and with reference to the accompanying drawings in which;

FIG. 9 is a view showing a composition of entry data;

FIG. 10 is a view showing a composition of a record;

FIG. 18 is a view showing the composition of a master file;

FIG. 19 is a view showing the composition of one record;

FIG. 20 is a schematic front view showing an example of display of the master data;

DESCRIPTION OF THE PREFERRED EMBODIMENTS

Figure 1:
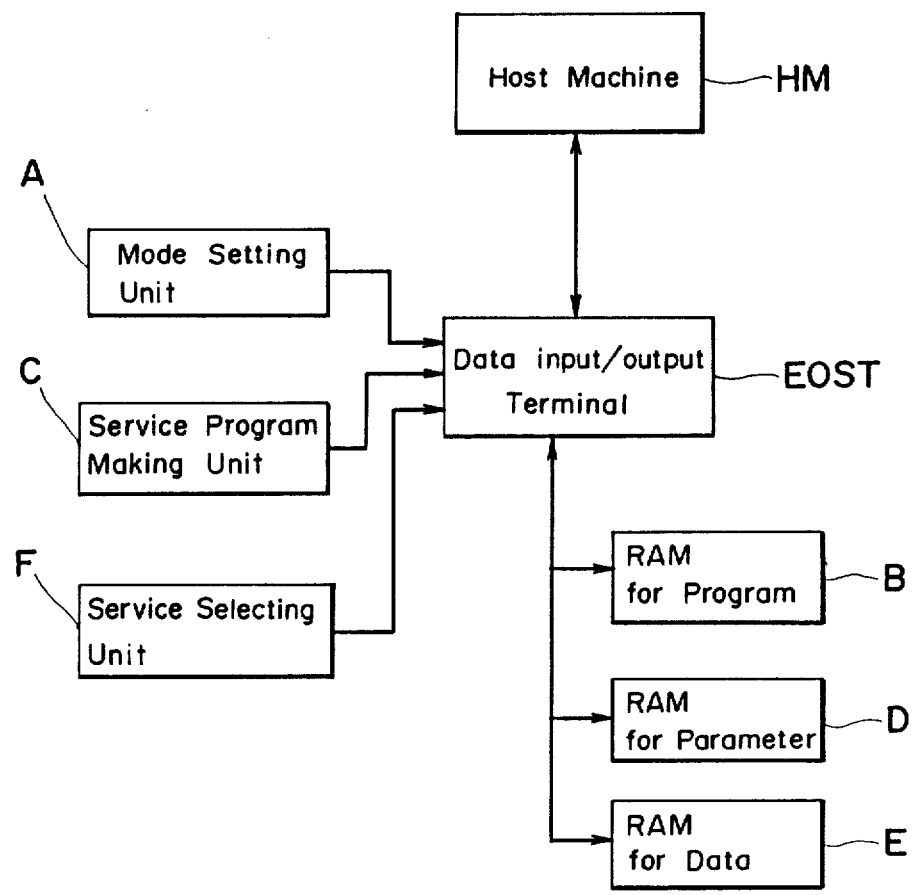
FIG. 1 is a block diagram showing essential means of the present invention.
Figure 2:
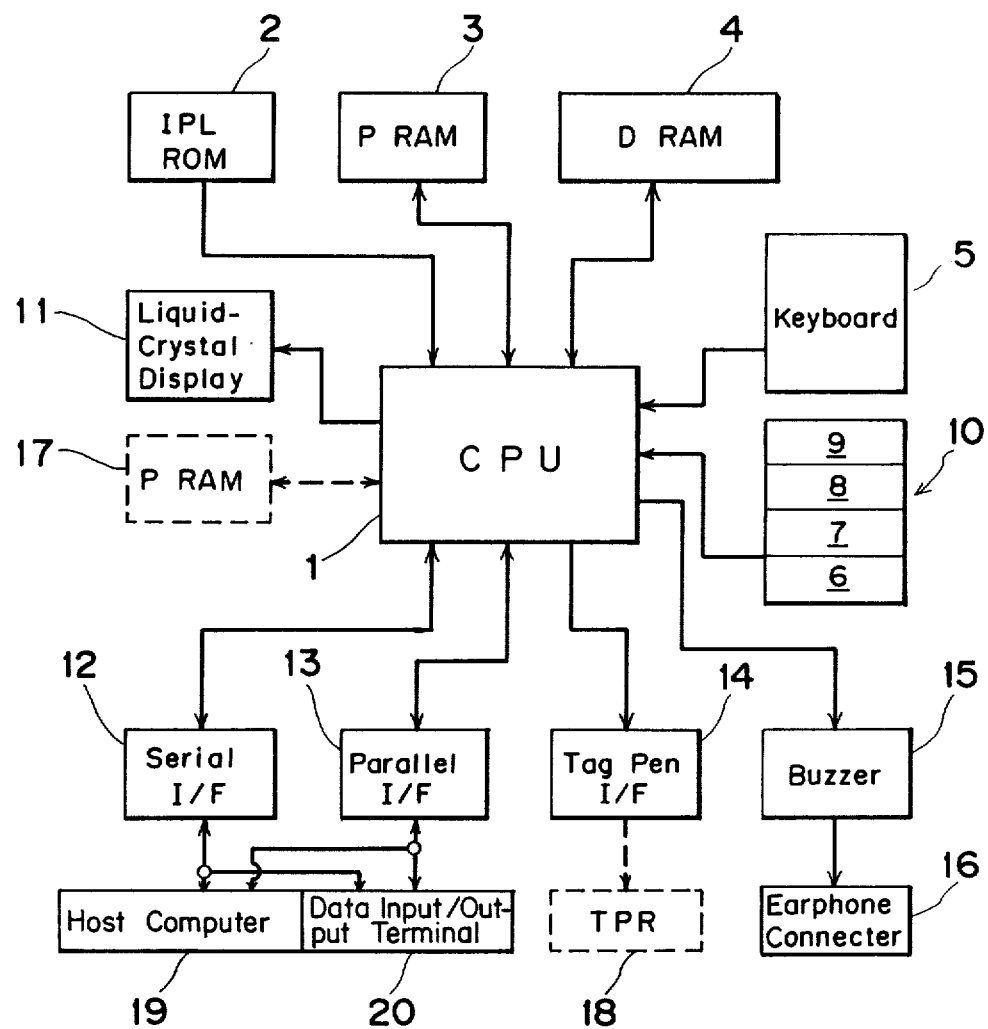
FIG. 2 is a block diagram showing a total system of the data input/output terminal according to the present invention.
Figure 3:
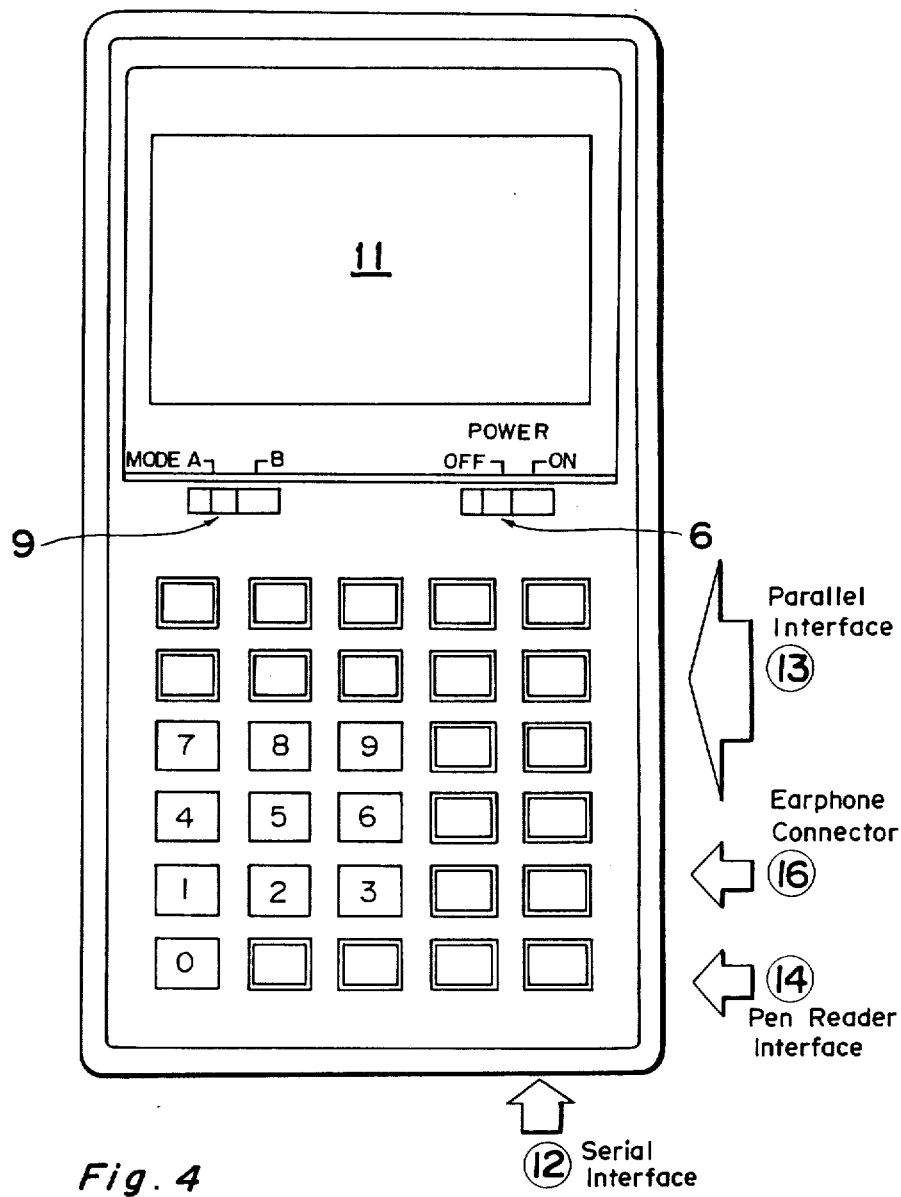
FIG. 3 is a front view of the data terminal.
Figure 4:
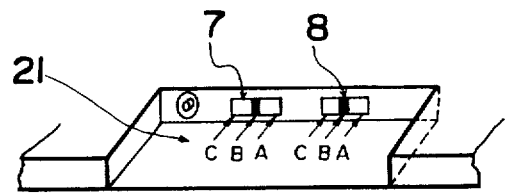
FIG. 4 is a partial perspective view showing system switches for designating operating mode of the data terminal.

FIG. 2 shows block diagram of the system of the data input/output terminal equipment and FIG. 3 shows a front view of the equipment.

The present data terminal is comprised of a central processing unit (hereinafter referred to CPU 1) being composed of a one-tip micro-processor;

a random access memory for loading an initial program (hereinafter referred to IPL ROM 2);

a random access memory for programs (hereinafter referred to PRAM 3); a random access memory for data being input and for system parameters being set (hereinafter referred to DRAM 4);

a key board 5 providing function keys and ten keys being operated at the time of setting system parameter and/or data entry;

switch means 10 comprising a battery (power) switch 6, first and second system switches 7 and 8 and a mode switch 9 each function of which will be disclosed hereinafter;

a liquid crystal display means 11 for displaying data input, indications, title, etc.;

a serial interface 12;

a parallel interface 13;

an interface 14 provided for a pen reader for reading bar codes;

a buzzer means 15 an a connector 16 for an earphone.

One more RAM 17 for programs and a pen reader 18 for reading bar codes (hereinafter referred to TPR 18) can be equipped as optional equipment.

CPU 1 is connected via serial interface 12 and/or parallel interface 13, to a host computer 19 and/or another data input/output terminal equipment 20.

As is shown in FIG. 3, ten numeral keys NK(i) (i=0-9) and twenty function keys FK(j) (j=1-20) are provided on the key board 5. The mode switch 9 is a slide switch for selecting either one of modes A and B. PRAM 3 and DRAM 4 are always backed up by a battery means (not shown) stored in the equipment. The first and second system switches 7 and 8 are arranged operably in the battery chamber 21 each of which is a switch having three selectable positions A, B and C. The first and second system switches 7 and 8 are used for designating a specified mode together with the mode switch 9.

[Main Routine]

Figure 5:
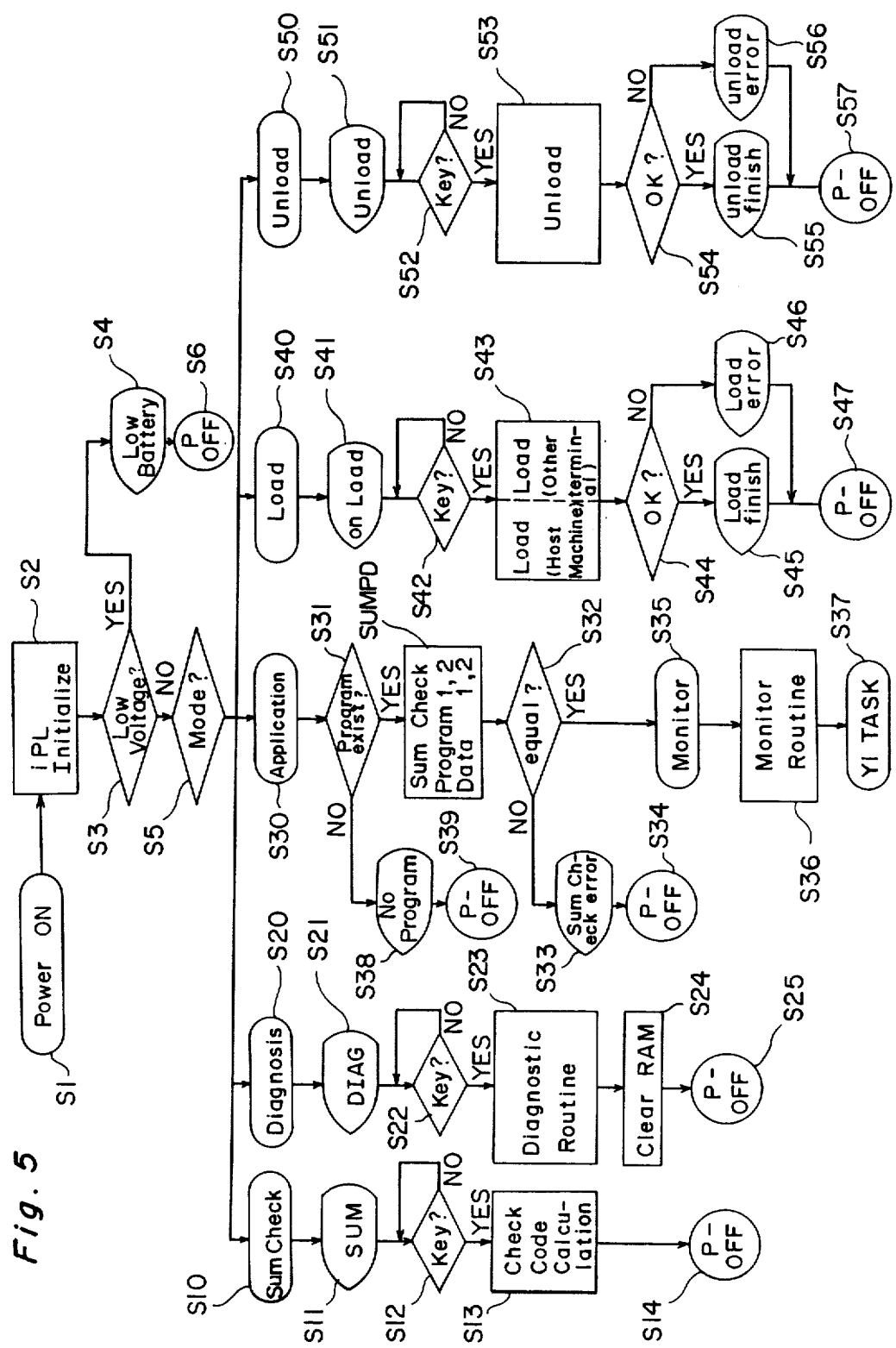
FIGS. 5 and 6 are flow charts showing a main routine program to be executed by the system according to the present invention.
Figure 6:
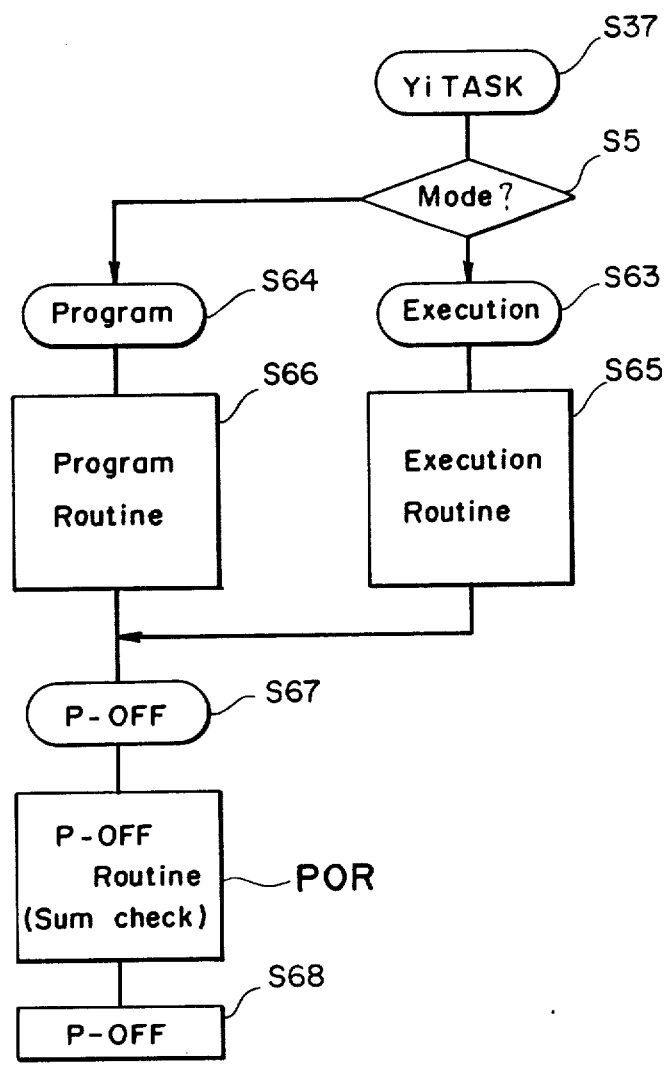

FIGS. 5 and 6 show a flow chart of the main routine that is proceeded by CPU 1.

As is shown in FIG. 5, when the power switch 6 is turned on in S1, the system is initialized first and is checked next as to whether the programs have been loaded and whether they are normal in S2. Then, the voltage of the battery is checked in S3. When the battery is normal, the mode to be proceeded by CPU 1 is identified in S5. The mode is designated by a combination of the first and second system switches 7 and 8 and the mode switch 9, as is shown in Table 1.

Five modes can be designated as follows.

(a) Sum Check Mode S10

The mode for setting sum check codes S11 into a predetermined memory area after calculating sum check modes of the programs stored in PRAM 3 and of the system parameters stored in DRAM 4.

(b) Diagnosis Mode S20

The mode for testing hardware such as ROM, RAM, the liquid crystal display, the key board and the buzzer by a diagnosis program S21 stored in ROM 2.

(c) Application Mode S30

The application mode is divided S31 into the parameter setting mode and the execution mode.

(c-1) Program Setting Mode

The mode for designating specifications with respect to each of services such as data entry services (maximum of seven kinds can be set), data output service (one kind), data input service (one kind), data collection service (one kind as an optional service) through setting or designating parameters.

(c-2) Execution Mode

The mode for executing each service program mentioned above according to operations necessary for initial setting, initial registration and selection of service such as data entry services, data output service and so on.

(d) Program Load Mode S40

The mode for loading programs and parameters S41 into PRAM 3 and DRAM 4 which are transmitted from the host machine and/or other data terminal equipment S43.

(e) Program Unloade Mode S50

The mode for unloading programs and parameters S51 having been stored in PRAM 3 and DRAM 4 to the host machine and/or other data terminal equipment.

Among these modes cited above, the program setting mode is the most characteristic mode according to the present invention. In this mode, each service program can be made through setting parameters that will become apparent hereinafter. In other words, the present equipment is commonly applicable for a variety of categories of business, since a plurality of service programs can be made most appropriately by taking the user's business requirements into considerations.

Therefore, the program setting mode will be explained hereinafter in particular.

[Program Setting Mode]

(1) Key Arrangement for this Mode

Figures 7, 8:
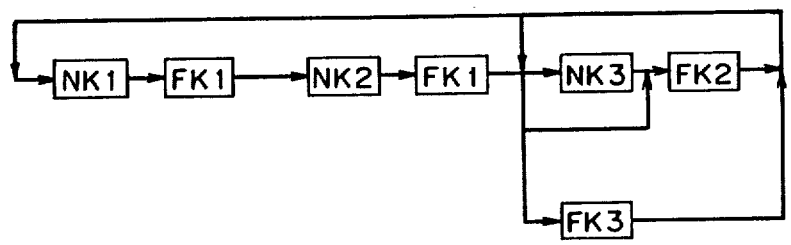
FIG. 7 is a plan view showing a key arrangement in the program setting mode.
FIG. 8 is a view showing a key sequence for setting parameters.

The key arrangement for this mode is shown in FIG. 7. This key arrangement is fixed in the mode. In the arrangement, keys to be operated are ten keys "0" to "9", six alphabetic keys "A" to "F", three function keys "FK1" to "FK3" and a clear key "CE".

(2) Setting operation in the Mode

Setting operation is always done according to a key sequence as shown in FIG. 8.

In FIG. 8, the operation NK1 is a key operation for designating a job number JOB# (for instance, of 4 digits), the operation NK2 is a key operation for designating an item number ITEM# (for instance, of 2 digits) and the operation NK3 is a key operation for designating data for setting parameters which are predetermined according to every parameter to be set. Function key FK1 tranfers the key operation from NK1 to NK2 upon the first push down thereof and displays the content of the job being designated by JOB# upon the second push down thereof. Function key FK2 transfers the key operation automatically to a next key operation for designating ITEM# or JOB# upon every push down thereof. Function keys FK3 displays the content of the next job upon the push down thereof. To check the designated jobs, function key FK3 is pushed down successively.

(3) Data Format of Memory for Registering Data

FIG. 9 shows the data format of the memory for registering data being used for data entry during the execution mode.

The initial registration record and service code record are fixed after having been set once according to the system. Each heading, detail and footing record is fixed with respect to each data entry service selected. The initial registration, service code, heading and footing record may not necessarily be set.

Each record except for the service code record is comprised of a plurality of items (fields) as is shown in FIG. 10.

(4) Setting Parameters for Each Heading, Detail and Footing Record

The heading record is provided for memorizing heading data such as a sum of individual quantities. Some uses are to sum individual amounts of money for determining the total amount, to store date and time upon inputting and/or to output data or the like. Parameters for setting the heading record can be designated through JOB# "0101" to "0114" and ITEM# "10" to "14".

Table 2 shows the manner for designating parameters of the heading record.

Detail records are defined for memorizing particular data such as a unit price of an individual article, and/or a quantity thereof. The manner for designating parameters of the detail records is shown in Tables 3-1 and 3-2.

The footing record is provided for finishing or completing detail records in such a manner as to memorize. For instance, the total amount of money summed up all through detail records which is defined at a position next to the final detail record. The manner for designating parameters of the footing record is shown in Table 4.

Next, formats for setting these records will be explained according to Tables 2, 3-1, 3-2 and 4.

[ITEM#10]

(a) Length of Each Item

Each length (number of digits) necessary for every item is designated by one of the integers from "01" to "15". C/D check codes, symbols such as decimal point ".", signs "±" etc. and item partition code are included in calculation of the number of digits. The length of each item designated is assigned to the memory for registering data.

(b) Display Area

Each area for displaying input data for monitoring upon input with use of the key board or input from the bar code reader TPR. The number of lines on which the data is displayed, the beginning digit on the line from which the data is displayed and the length of digits are designated respectively.

(c) Item Partition Code

Whether the item partition code is to be memorized is designated upon the memorization of each item in registering data. When the item partition code is to be memorized, the code is designated with one of the numerals or alphabets shown in Table 2. It is to be noted that the codes in the case of 4 BIT is differentiated from those in the case of 8 BIT.

(d) Key Code for Indicating Finish of Input

A key code is designated with two digits to indicate that the input of the final item has been completed. When the designated key code is input, all inputs regarding the item are supposed to be finished.

(e) Calendar Function

The present system provides two calendar functions. One function is being able to write the calendar into the initial registration item and the other function is being able to read the calendar of the item in the heading or detail records. It can be designated whether the calendar function is necessary or not. When the calendar function is designated, one of the three calendar types, "date", "time" and "date and time", is specified.

(f) Input with Use of TPR

It can be designated whether the input with use of TPR is possible. Since the input with use of ten keys is always possible, multiple inputs are possible when the input with use of TPR is designated.

[ITEM#11] Designation of Check Method

(a) Check Method with respect to the Calendar

The content of the calendar is checked by inequalities such as $00 \leq hours \leq 23$, $00 \leq minutes \leq 59$.

(b) Extent Check

The extent check is provided for checking whether the data input, the amount of the money for instance, is within the extent defined between an upper and lower limit.

One combination can be designated among many, for instance ten combinations with respect to the upper limit and the lower limit which are defined as in the Table 5. If the calendar check is not designated with respect to one item, then multiple extent checks (maximum 5 checks) become possible. Upon multiple extent checks, every check is done with use of "OR" logic and, in every check, only a significant number except for signs and the decimal point is checked.

(c) Check/Digit (C/D) Check

Figure 11:
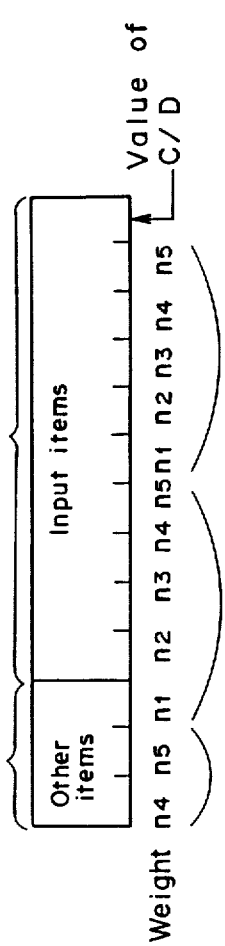
FIG. 11 is a view showing the manner for assigning check weights.

This is a C/D check against input items. As is shown in FIG. 11, a C/D check can be done to the head of an input item when another item is added. FIG. 11 shows a method for assigning weights when five numbers $n_1$, $n_2$, $n_3$, $n_4$ and $n_5$ are designated as weights therefor.

The content of a C/D check can be specified in Table 6 where a C/D check table in which a maximum of six kinds of C/D check can be defined. Parameters to be designated are the number of C/D check tables, whether or not other items are added, and the number of other items if other items are to be added.

(d) Comparison Check

In the comparison check, data input are compared with memorized data for an initial setting. As the result of the comparison, data input is processed duly when both data correspond to each other. When no correspondence between both data is obtained, an error message is displayed.

(e) Sum Check

Figure 12:
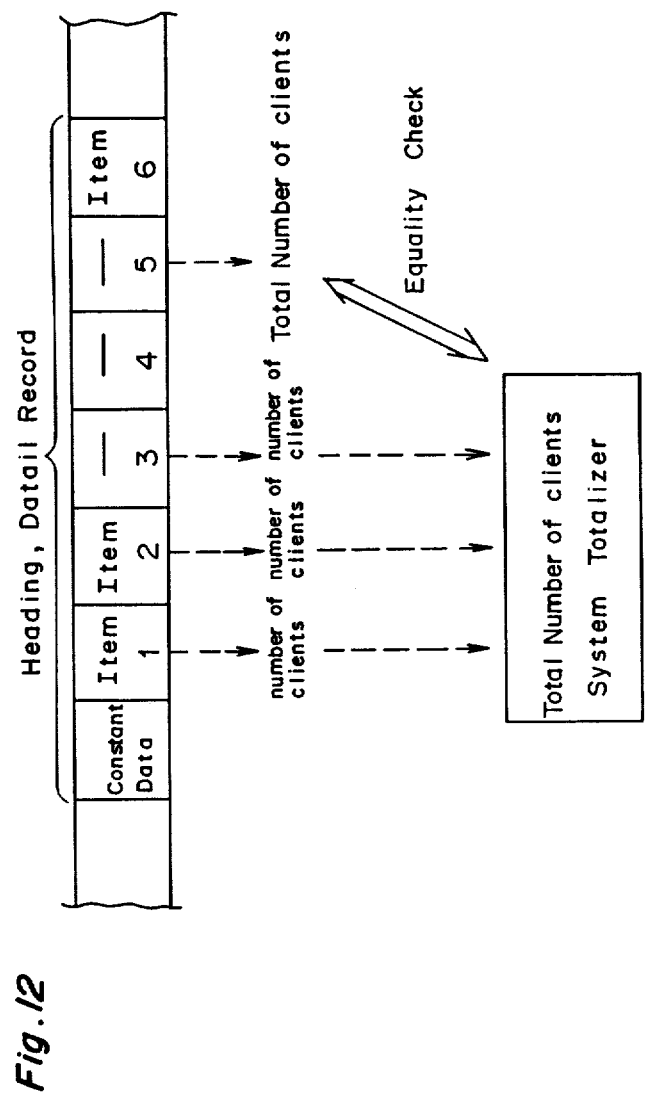
FIG. 12 is a view showing the manner for equality check with use of a system totalizer according to the present invention.

This check is an equal check for checking whether the total value obtained through items in the heading or the detail records is equal to the value obtained by a totalizer provided in this system. FIG. 12 shows an example of the sum check. In this example, the total number of clients obtained in the system totalizer by adding each number of clients being input into items of ITEM#1 to 3 respectively is compared with the total number of clients input into the item of ITEM#5. The sum check is available to both the heading and detail records. One of the numbers of the system totalizer from "01" to "04" is designated for the sum check. The total value (sum value) is cleared when the sum check has been finished. The system totalizer will be more fully disclosed in section (c) entitled "Use of System Totalizer".

(f) Master Data Search Check

Figure 13:
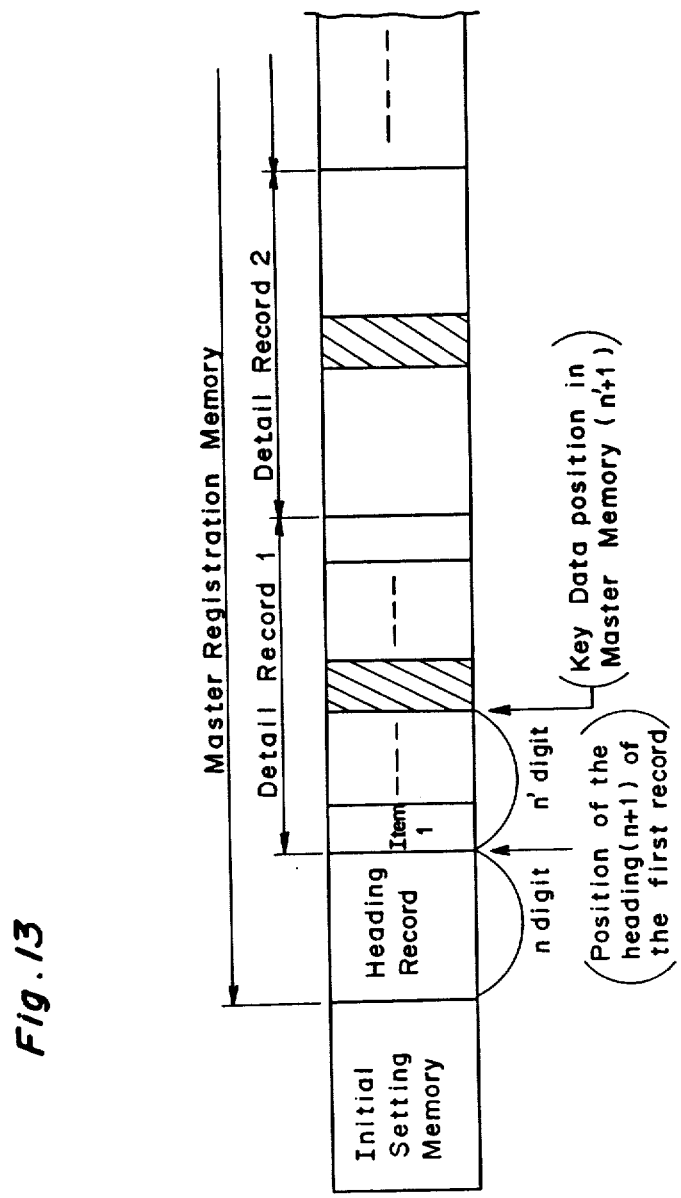
FIG. 13 is a view showing a composition of the master file.

This check can be done with respect to input items of the heading and detail records. In the case that the check is designated about an input item, the following processions are executed. FIG. 13 shows a composition of the master file.

(f-1) There are two types of designations for the search check of the master data. One is a designation of key input data, as is shown in Table 7, and the other is a designation of the format of the memory for registration of the master, as is shown in Table 8.

(f-2) When the key is designated, the group of the detail records are searched with the key from the top thereof.

(f-2-1) If there is no key in the master registration memory, then it is possible to designate either one of "Error" or "Neglect".

When "Error" is designated, the buzzer is driven in a mode of high tone for a long period. The buzzer is stopped by the operation of the clear key CE. Then, data with respect to the corresponding item are input again.

When "Neglect" is designated, data with respect to the next item are input after the completion of the input of the corresponding data.

(f-2-2) If a key is in the master registration memory, then a maximum of ten items of the master data are displayed on the liquid crystal display 11. The content of each item displayed is referred to upon input of data with respect to items of detail records.

Designation of the Display Area for Each Item of the Master Data (This should be done at every data entry.)

A line number, a top digit number and a number of digits for the display of each item are designated. If the line number is designated to "0", then the corresponding item is not displayed. The position, length and editorial type for the display with respect to each item of the master data are designated according to Table 9 and Table 10.

In Table 10, parameters about editorial types for the display are not assigned as follows:

"0"—No edition, namely, data on the memory are displayed as they are.

"1"—Only significant number is displayed. Zero or zeros being positioned before the first significant number are suppressed.

"2"—Significant number is displayed down to one decimal place. Top zero or zeros are suppressed.

"3"—Significant number is displayed down to two decimal place. Top zero or zeros are suppressed.

Contents being displayed are cleared after final items of the heading or detail records have been input.

Master Data Search Check will be disclosed particularly in the section entitled "Master File Functions".

(g) Confirmation Check for Completion of Registration of Data

This check is possible only about input items of the detail record. In the case that the check is designated on the input item, the following processions are done.

First, the input data (of a positive integer) is edited in the same manner as that of the memory format. The detail records of the data registration memory are searched from the top thereof, with the key obtained as the result of the edition mentioned above.

(g-1) When data have been input already, contents of detail records searched are displayed and the buzzer is driven with a high tone.

Editorial method for the display is as follows:

The item having a fixed digit construction is displayed as is the data in the memory.

The item having a variable digit construction is displayed while suppressing top zero or zeros (If it has a decimal fraction, the decimal point "." is displayed together).

Then, the following processions will be done.

When the delete key is operated, the buzzer is turned off and the display is cleared. All of the area covering the detail records that have been searched are filled with a predetermined special code, this code may be the same as the memory clear code used upon deleting in the memory search. Again, data are input with respect to the items having been deleted.

When the key indicating no deletion is operated, the buzzer is turned off and the contents of the display are cleared and, then, data regarding the item is input.

It is possible to designate the key for deleting detail records of the data registration memory or the key for not deleting those.

(g-2) When data is not input yet, data of the next item are input after processing the input data.

[ITEM#12] Memory Editorial Method

Memory editorial methods on the heading record, the detail record and the footing record are different from each other in designating method on the parameters. Hereinafter, the memory editorial method for the detail record will be explained particularly.

(a) Memory Editorial Method (1) "00-02" Position of Decimal Point and Number of Places First, the position of a decimal point on the memory is designated by one of the integers "00", "01" and "02" (When "00" is designated, no decimal point is assigned in the memory).

Data input is edited referring to the position of the decimal point designated as a standard therefor. In this case, the overflow portion of the memory area is cut off and the blank portion of the area is filled with zeros. When "00" is designated, data are edited referring to the most right-hand position of the area as a standard. It depends on the designation of the system parameter whether the position of the decimal point is memorized or not.

(2) "10" Deletion of the Last Digit

When "10" is designated, the last one digit (C/D value) of the input data is deleted and the input data deleted is memorized in the state of "Flush Right". The overflow portion is cut off and the blank portion is filled with zeros.

(3) "2n" Addition of C/D

When "2n" is designated, a C/D value is added to the last digit of the input data and, then, the input data is memorized in the state of "Flush Right". The parameter "n" (n=1-6) designates one of item numbers in C/D Table. Also, the overflow portion is cut off and the blank portion is filled with zeros.

(b) "30" Addition of Another Item (Data Synthesis)

When "30" is designated, the input data is coupled or synthesized with the input data of the other item of the heading record and/or the detail record.

In this case, code "30" is first designated and the item number of the item to synthesized (or coupled) is designated.

(c) Use of System Totalizer

In the present system, four totalizers (14 digits of the integer portion and two digits of the decimal fraction) are provided and can be used for the following objects.
- to save input data,
- to sum up input data,
- to read data of the system totalizer,
- to compare, for equal check, input data with the data obtained in the system totalizer,
- to compare, for equal check, two values with each other that are obtained in respective system totalizers.

These method can be designated in combination with at least one input item of the heading, the detail and the footing records as is shown in Table 11.

[Applicability]

(1) Application in the Heading or Detail Record

Figure 16A:
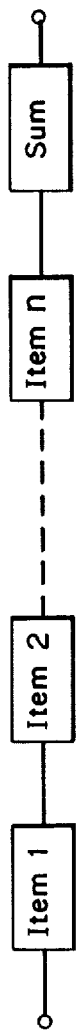
FIGS. 16(a), (b) and (c) are views showing manners of use of system totalizer respectively.

In the case that the individual value is input into individual item #1 to n and the sum of these individual values is input into the item therefor, as is shown in FIG. 16(a), an equal check between the sum being input and the sum obtained in the system totalizer is done. In this case, it is impossible to input the sum data into the corresponding item from the system totalizer without operating ten keys.

(2) Application in the Detail and Footing Records

Figure 16B:
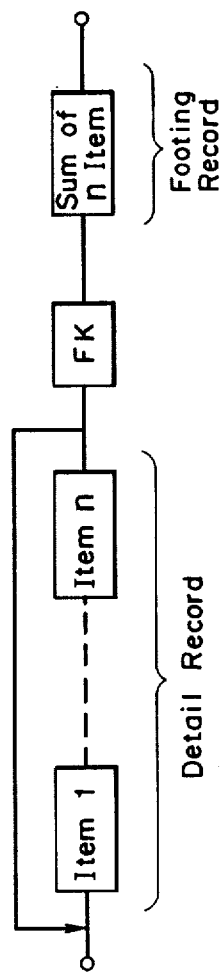

In the case that the individual value is input into an individual item of the detail record and the sum of these individual values is input into one item of the footing record, as is shown in FIG. 16(b), the sum having been input is compared with the sum data obtained in the system totalizer during input of the individual value. In this case, the sum obtained in the system totalizer can be input into one item of the footing record without entry by ten keys.

(3) Application among the Heading, Detail and Footing Records

Figure 16C:
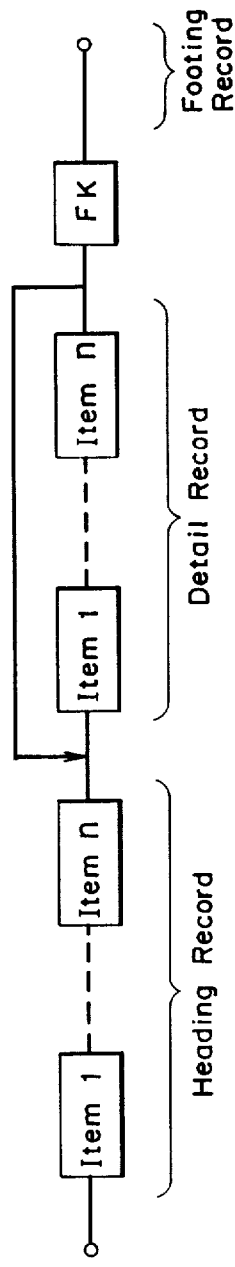

Referring to FIG. 16(c), the sum data of the individual value to be input into an individual item of the detail record is input first into the item #n of the heading record and the sum data is saved into a system totalizer upon the input thereof. Thereafter, individual data is input into individual item (#1 to #n) of the detail record. These individual data are added in other system totalizer. In this case, the sum data having been saved is compared with the sum obtained in the other system totalizer in order to equally check.

[ITEM#13] Designation of Fashion for Inputting Data with Keys

With respect to the detail record, four fashions for inputting data with keys can be set. One fashion is set for the heading record or the footing record.

(a) Designations of Total Number of Digits

The total number of digits is that of a significant number of the data and therefore, does not include the decimal point "." and "±" signs and the like.

(b) Number of Digits of Decimal Fraction

Maximum 2 can be designated. If data has not any decimal fraction, "00" is designated.

(c) Input Mode

"0"—The number of digits is fixed and only a positive integer can be input. Sign "−" and decimal point "." are impossible to input.

"1"—A positive integer with an arbitrary number of digits can be input but sign "−" and decimal point "." cannot be input.

"2"—A positive or negative integer with an arbitrary number of digits can be input but decimal point "." cannot be input.

"3"—A positive real number with an arbitrary number of digits can be input but sign "−" cannot be input.

"4"—A positive or negative real number with an arbitrary number of digits can be input.

(d) Omission of Deposition by Ten Keys

It is designated whether or not the deposition by ten keys can be omitted. In the case that the omission is designated, it is designated whether the omission is regarded as "0" or "1". When it is designated, the entry with use of only the end key becomes possible.

(e) Edition for Input Data (e-1) "00"—Flush Right of Input Data

Input Data are flushed to the right and all of blank digits are filled with zeros.

(e-2) Flush Left of Input Data

Input data are flushed to the left, all of the blank digits are filled with one of the filler codes (HEX"0-"_"9").

(e-3) Beginning Digit for Replacement of Data upon Synthesizing Data

Figure 14:
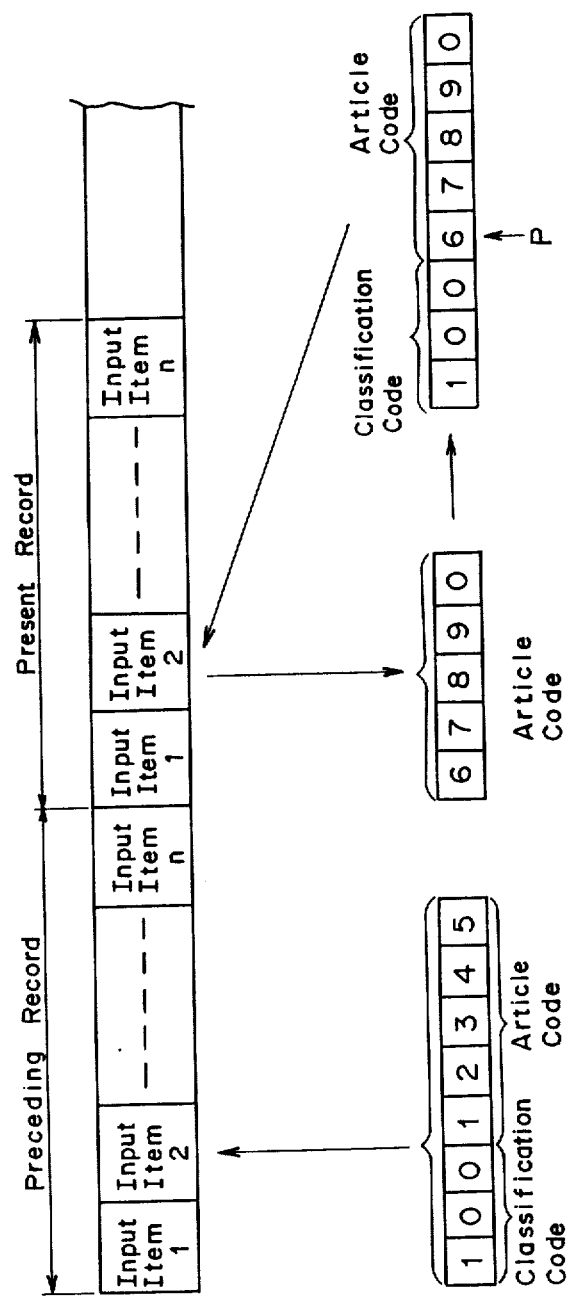
FIG. 14 is a view showing the manner for synthesizing data according to the present invention.

FIG. 14 shows an example of data synthesis with respect to the item #2. As shown in FIG. 14, in the case that a classification code is to be input into the upper three digits of the item #2 and an article code is to be input into the lower five digits thereof. The article code input into lower five digits at this time is synthesized with the classification code having been input into the three heading digits of the preceding record. In this case, the top digit P of the data to be replaced with a new data is designated according to the key input fashion as is disclosed in ITEM#11.

The synthesized data (classification code+article code) is input into the item #2 of the present pending record.

The data synthesis method as mentioned above is able to simplify entry operation in such a case that all data have a portion common to each other.

Figure 15:
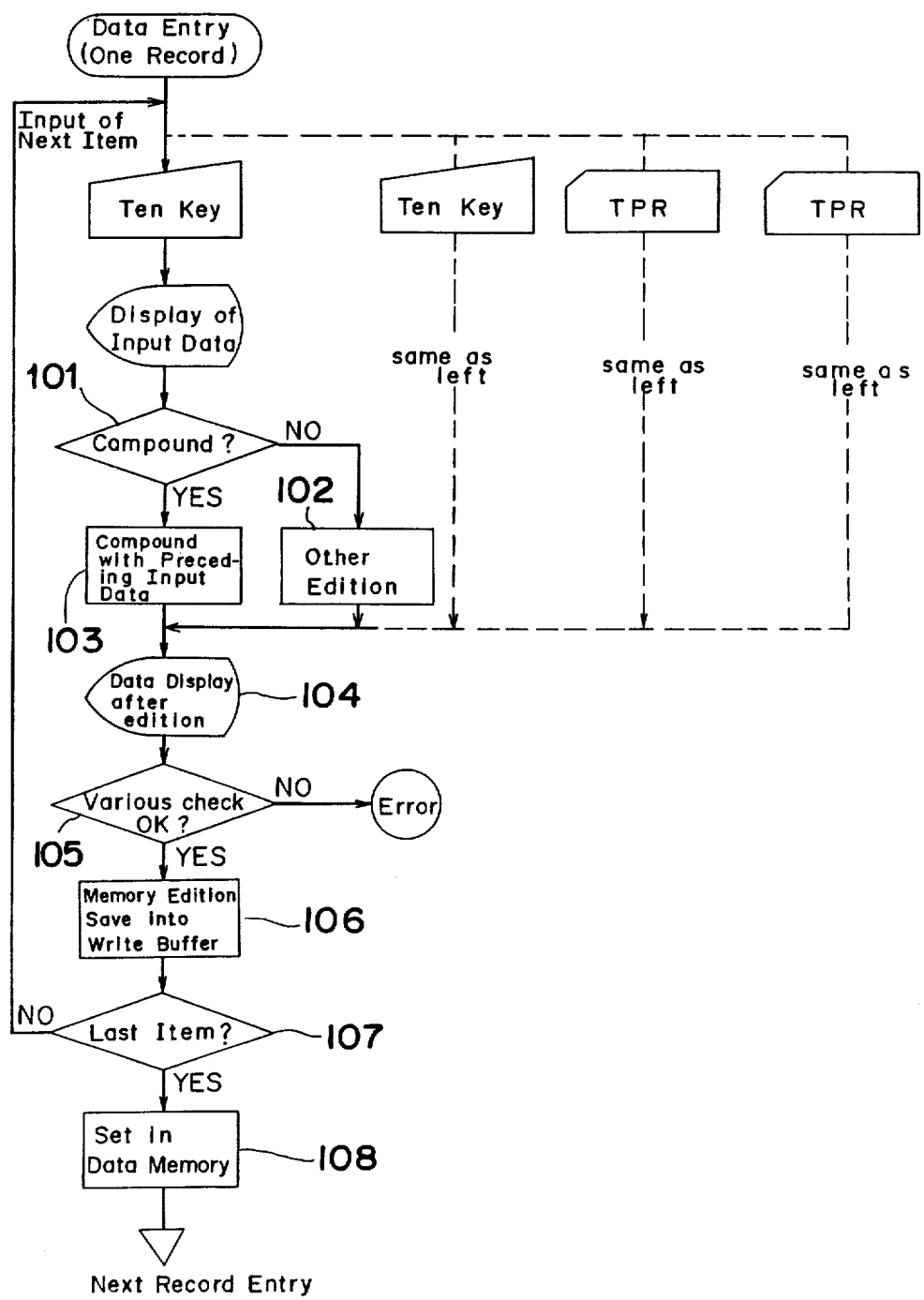
FIG. 15 is a flow chart showing the manner of data synthesis in the execution mode.

FIG. 15 shows a flow chart for data synthesizing upon data entry in the execution mode.

When data entry is begun by operations of ten keys or with TPR, input data is displayed on the display 11 and at the step 101, it is decided whether the data synthesizing is designated or not. In the case of "NO", other editions are processed as designated in the step 102. In the case of "YES", the data synthesizing is done at step 103 as stated above.

The data synthesized is displayed so as to confirm it at step 104. At step 105, a variety of checks are made as stated hereinafter. When all of checks are cleared, a memory edition is executed and data are saved in the Write Buffer. These processes are repeated until the data entry of the last item have been completed (step 107). The data thus input and or synthesized are memorized in DRAM at step 108 and, then, data entry for the next record is started.

If the designation of (e-2) or (e-3) is designated, then the edited data are displayed again on the monitoring area after completing data entry with use of keys.

Checks above mentioned are executed against data having been edited already.

[ITEM#14, 15] Designation of Entry Fashion by TPR

If data input is finished with one scanning of TPR, then the entry fashion is designated in ITEM#14. If data input is finished after a plurality of scannings of TPR, then the entry fashion is designated in ITEM#15.

The designation of the entry fashion made essentially by designating JOB# in Table 12 for TPR input. Referring to Table 12, a number of digits of data to be read, a position from which the effective data are started, a length of the effective data, existence of partition code and partition code itself, the type of bar code (NW-7, JAN(8, 13 digits), 2 out of 5 and INTERLEAVED 2 out of 5, the table number of a C/D (Check/Digit), and the digit number of the decimal portion of a positive (+), negative (−) and real (±) data are designated respectively.

In the case of a plurality of scannings, conditions for the completion of inputs are designated.

The conditions are as follows;

When data having a digit number and a partition code different from those designated are input, or when data is input from the key board.

When data other than "0-9" and the decimal point "." is input from TPR. (When sign "−" is input, the corresponding data is regarded as negative data and others are regarded as positive data.)

[C/D Calculation with respect to Data including One or More Symbols such as a Decimal Point]

In order to prevent errors upon reading bar codes, data having been read are checked by a C/D check method. In the case that data is input by ten keys, a C/D check is done in order to prevent similar deposition mistakes. However, the C/D check is available only for integers. Accordingly, it is impossible to do a C/D check on data including symbols such as a decimal point, "±" signs, etc.

In the system according to the present invention, there is assigned a special number to each symbol in order to make a C/D check possible. Namely, the symbol included in the data is replaced by the special number designated upon calculation of a C/D.

The manner for designating these numbers is shown in item #3 of Table 12. In item #3, three integers of two digits (00–99) are assigned to "−" sign, "+" sign and the decimal point respectively.

Figure 17:
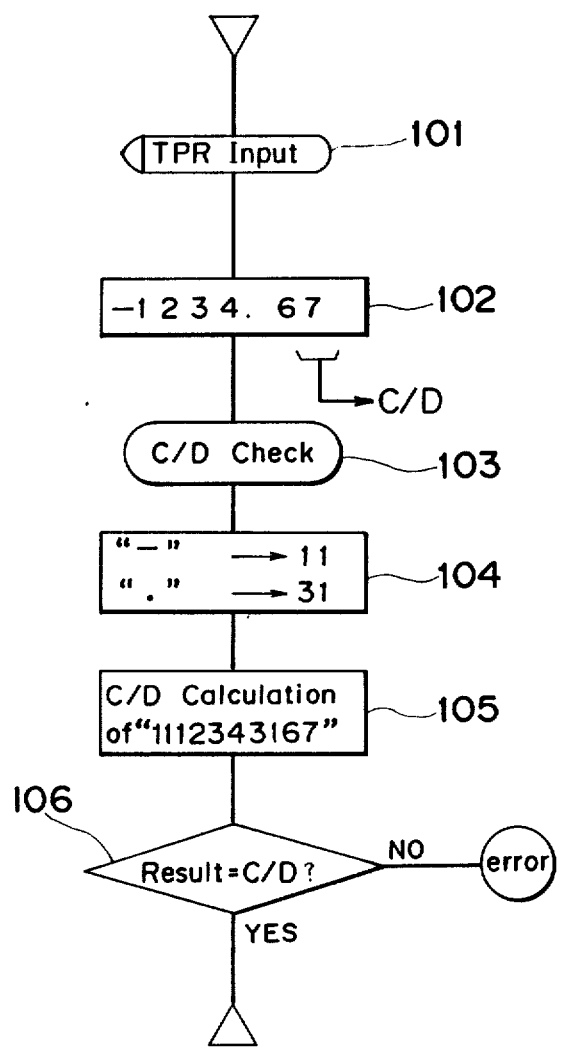
FIG. 17 is a flow chart showing the manner of C/D check about data including signs and/or symbols.

FIG. 17 shows a flow chart for a C/D check. When a real number, for example "−1234.67" is input from TPR at step 102, it is decided whether a C/D check should be done at step 103. When a C/D check should be done, "−" sign and "." decimal point in the input data are replaced respectively to decimal values designated, for example "11" and "31", at step 104. Then, a C/D value is calculated with respect to the number obtained as the result of the replacement, for example "1112343167", at step 105. At step 106, the result thus obtained is compared with the C/D value. If the former is not equal to the latter, then "Error" is indicated on the display. This idea is applicable to data including the symbols " ", "$" and the like, indicating the currency of individual country.

The terminal equipment according to the present invention is able to provide a variety of functions selectively in addition to those functions as disclosed in the foregoing.

Hereinafter, main functions will be explained separately.

[Error Check of Data having been Set]

As is clear from the foregoing, the present system is characterized in that a plurality of service programs can be made through the designation of system parameters and can be executed according to designated system parameters. Therefore, system parameters are required to meet a very high reliability substantially equal to that of programs.

Conventionally, system parameters have not been checked, although check about programs have been done with the use of a checking method such as "Sum Check".

In the system according to the present invention, check about system parameters can be possible as well as the check about programs S64 in order to avoid malfunctions. As is shown in FIG. 6, the check about parameters are executed after the program routine S66 has been completed and the power switch has been turned off.

Namely, when the power switch was turned off after setting of system parameters had been completed S68, Power-OFF Routine POR is executed for checking parameters which were set during program setting mode. In the routine POR, check codes such as Check Sum Code are calculated about the memory area where set parameters are memorized and obtained check codes are at a predetermined memory area.

Thereafter, when the power switch is turned on in order to execute a service program mode through designations of parameters or when a function key is pushed down S12 to start an application program, it is first judged whether the programs are loaded and, then, Sum Check is done as indicated in the step SUM PD of FIG. 5. In this Sum Check routine, both programs and parameters are checked S32 respectively. Accordingly an indication of Check Sum Errors is displayed S33 and the execution of the program is stopped S34, if there is at least one undesirable change caused by an unknown origin in the parameter memory area.

In the case that the execution of the program is stopped, each parameter is checked in the Parameter Setting Mode, for instance by comparing each parameter being displayed with that in the data setting table.

Thus, according to this function, an undesirable change in system parameters can be found before the run of the program and, therefore, correct service program can be always executed.

[Master Filing Function]

The master filing function according to the present system is comprised of a series of functions as follows:

(A) A function which allows having several master files including reference data for referring upon the data entry into the data terminal, (B) A function which allows searching of one or more master files with the key data entered and displaying data related thereto, (C) Allowing the possibility to freely lay out the master file, (D) A function which allows selecting data needed for every service and displaying data at an arbitrary position, (E) A function which allows reading of the master file being displayed as data, (F) A function which allows loading of the master file from the host machine and updating of the master file manually, (G) A function which allows clearing of the master data being displayed for reference whenever data entry of one record is finished.

According to these functions, a variety of merits are obtained as follows;

(1) Entry operation is easily made, since it becomes possible to refer to the corresponding data during the data entry, (2) Entry mistakes can be avoided, (3) It becomes unnecessary to search data separately, (4) It becomes possible to control a variety of data with master files, (5) It becomes possible to search and/or correct master files, and (6) The master file can be displayed with a suitable format.

(a) Composition of the Master File

The master file is defined as an assembly of records having a the same predetermined length, as is shown in FIG. 18, which have numerical data indicating the beginning digit of the first record thereof as the top data.

Each record thereof contains, as shown in FIG. 19, a top data indicating the beginning digit of a key data MKey and the key data MKey through which the master file is searched. The master file is set according to the Tables 13 and 14.

Each record is comprised of ten items from the first to tenth item. The length and beginning digit of the record are designated according to tables mentioned above.

Formats for displaying master data as references are set by designating a display line $l_i$, beginning digit $d_i$ and digit length $m_i$ of each item i at the item #21 in JOB#4301 of Table 13. Further, an editorial method for display is designated according to Table 15. FIG. 20 shows an example of the display.

(b) Making the Master File

The master file of the terminal equipment is made by reading the corresponding master file of the host machine serially or parallelly.

Figure 21:
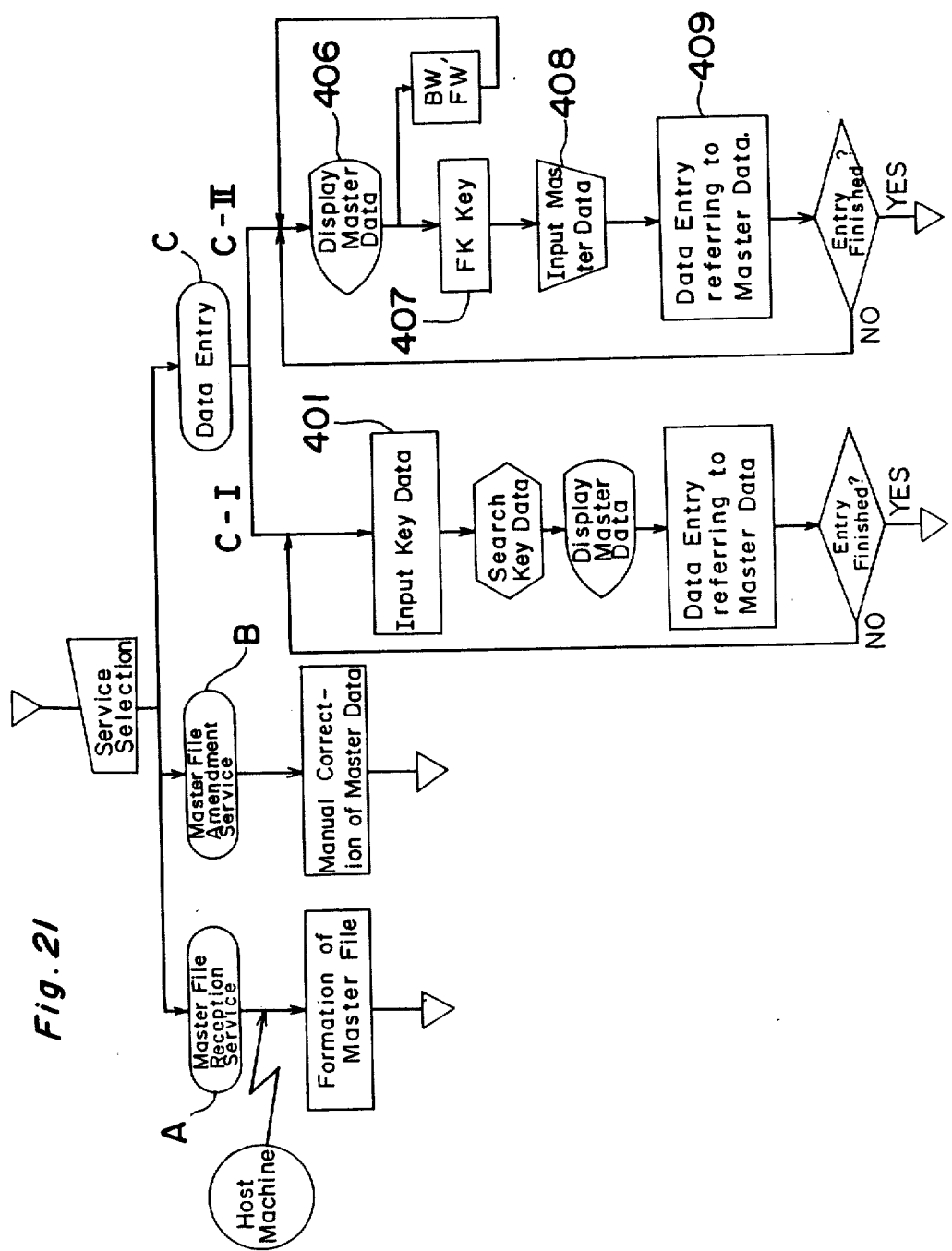
FIG. 21 is a flow chart showing the manner of data entry with use of the master file.

FIG. 21 has a flow chart showing a manner for data entry using master files. In the flow shown in FIG. 21, when the job A for receiving the master file is chosen, the present terminal equipment is connected to the host machine with the serial or parallel receiving cable. When the key therefor is operated, the master file of the host machine is read out and is memorized in the memory area of the terminal equipment reserved therefor to construct the master file therein.

The master file can be made with respect to each service such as an ordering service, stock management or the like.

When the job B for correcting master file is chosen in FIG. 21, the master file having been made can be corrected manually by monitoring data thereof.

(c) Master Data Search Check

When the job C for data entry is chosen and the kind of service (ordering, stock management, etc.) is designated for the data entry to be done, the master data search check is executed as follows. This check, however, can be done only when the master data search check code is designated to "6000" at item #11 for designating the check method of the Table 3-1.

The check can be done in two modes C-I and C-II as shown in FIG. 21.

(1) C-I Mode

In this mode, the key data MKey through which the master data is searched is designated at the step 401.

Parameters for the key data in the record are set according to Table 16.

Figure 22:
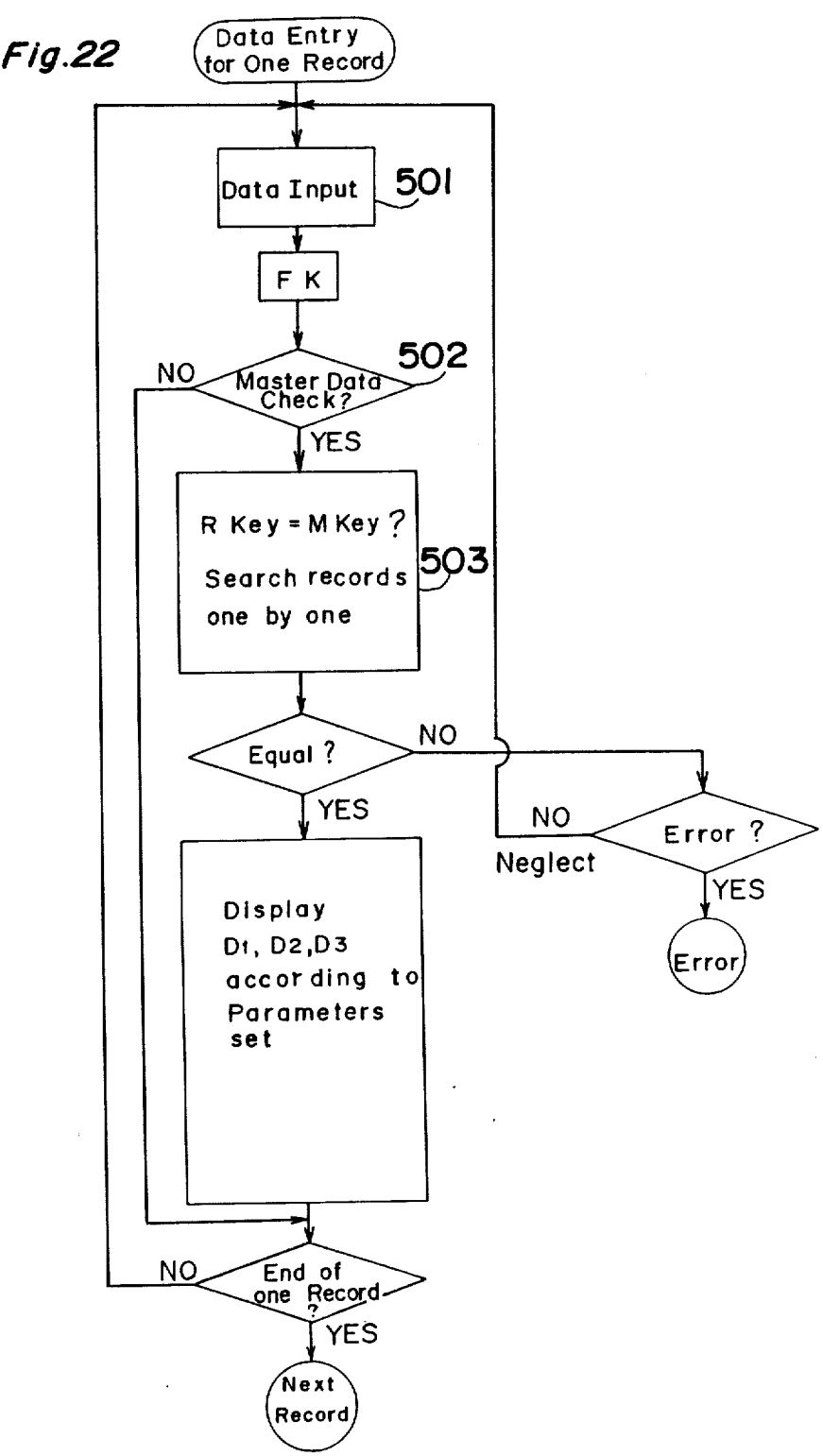
FIG. 22 is a flow chart showing the manner (C-I) shown in FIG. 21 more particularly.

The mode switch is operated in set mode and the check is executed according to the flow chart shown in FIG. 22.

When data of one record were input at step 501, one of function keys FK is operated. At step 502, it is decided if the search check for the master data should be done or not. If the check is to be done, then it is made by searching about each record whether or not the key data MKey of the record of the master file corresponds to the key data R key which was entered.

When MKey of the record corresponds to the RKey, the record having the MKey is displayed according to the display format mentioned above. Referring to the contents displayed, data for other items are entered. When the entry operation for one record is finished, data for the next record are entered and the search check is done therefor.

If there is no record having the key data MKey which corresponds to the key data RKey, then "error" is displayed or the record is neglected according to the designated parameters.

(2) C-II Mode

In this mode, the first record of the master file is displayed at step 406 in FIG. 21. When the displayed data is not data intended, the feed-forward function key is pushed and the second record is displayed. Thus, records of the master file are monitored successively. When the data intended is displayed, a predetermined function key FK is pushed at step 407. The key data MKey of the corresponding record of the master file is read at step 408 and is memorized as the corresponding item of the entry data. Consequently, data for other items are entered referring to the data displayed at step 409. Alternately, data of other items of the ecord in the master file can be memorized, similar to the case of the key data. When the data entry for one record is finished, data entry is continued for the next record.

[Memorizing Decimal Point]

Data being treated in the terminal equipment can be integers and/or real numbers. In the case that the data is a real number, it may be data having a decimal point of a variable digit or of a fixed digit. Upon memorizing data of many types, data of an integer or of a real number of a fixed digit, it is not necessary to memorize the decimal point itself although it should be memorized with respect to the data of a real number of a variable decimal point. Contrary to the above, it may be advantageous for processing data to another data terminal to memorize data about the decimal point even in the case of an integer or a real number of a fixed decimal point. Thus, the necessity of memorizing decimal data depends on conditions under which data are processed. Accordingly, it is desirable to be able to choose if data about the decimal point is to be memorized or not according to properties or conditions of data to be processed. Further, the volume of memory can be reduced when compared with the case in that every data about the decimal point is memorized without any exception.

Figure 23:
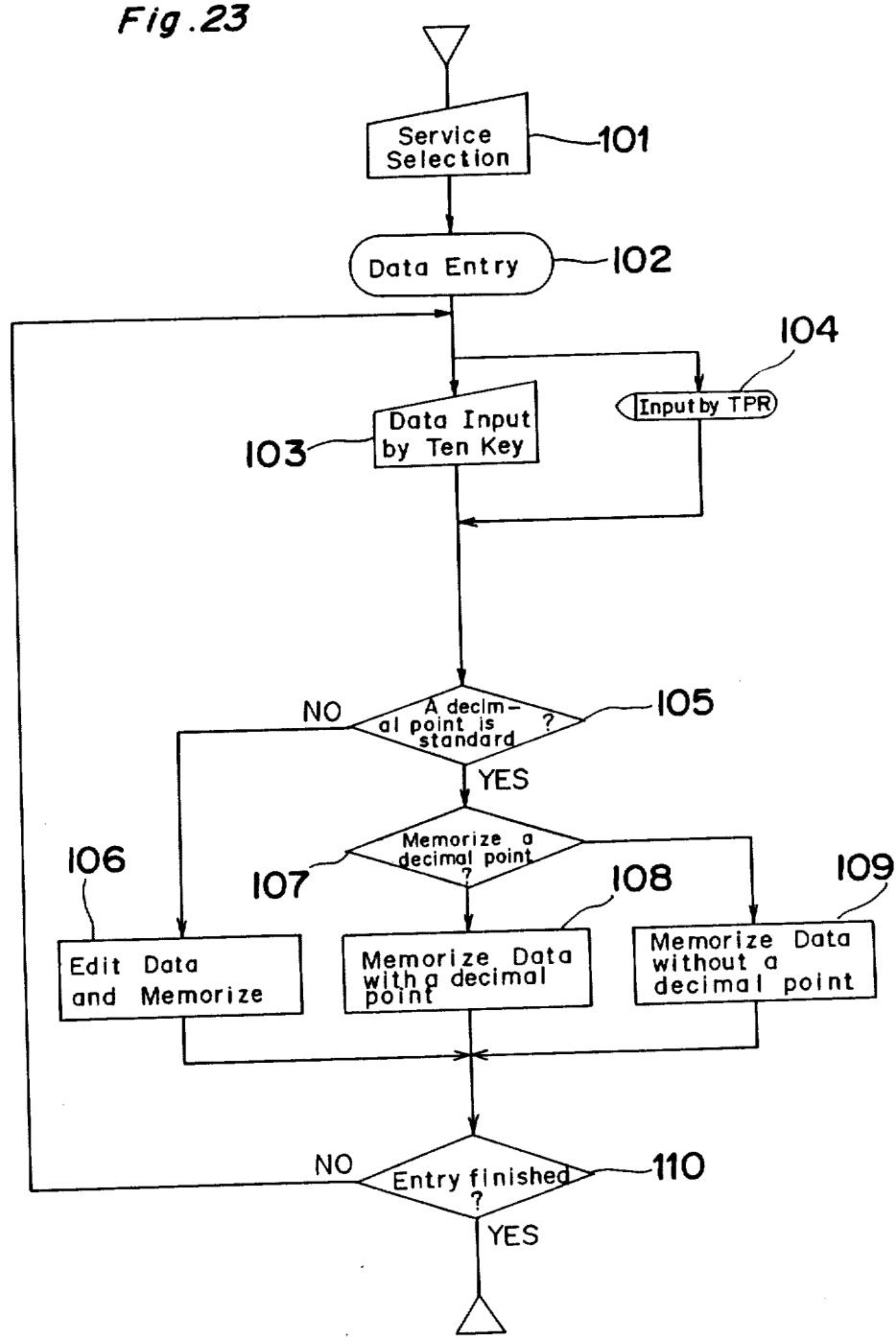
FIG. 23 is a low chart showing the manner of procession about data with a decimal point.

FIG. 23 shows a flow chart therefor. As shown in FIG. 23, when the data entry job is selected at step 101, an application program corresponding to the data entry job is called at step 102, and data are entered with use of ten keys (at step 103) or through TPR (at step 104).

At step 105, it is decided if data should be memorized dependent upon the position of a decimal point. In the case of "NO", input data are edited according to the editorial method designated ("Flush Right" or "Flush Left" etc.) and are memorized.

In the case of "YES", it is decided if the data about the decimal point should be memorized or not at step 107. In the case of "YES", the data are memorized with the decimal point respectively at step 108. In the case of "NO", data are memorized without the decimal point even when it is included therein (step 109).

After the data are memorized at one of steps 106, 108 or 109, it is decided if data entry is finished at step 110. If it is not finished, then data are entered further at step 103 or 104. When the data entry operation is completed, they are transferred to other operations.

According to the data entry program mentioned just above, when a real number for instance "123.45" is entered, it is memorized as "00123.45" at step 108 and, at step 109, it is memorized as "0012345".

Decisions on whether or not the decimal point should be the standard point upon memorizing data and on whether or not the decimal point should be memorized together with other data are determined by parameters designated in the program setting mode.

[Omission of Deposit by Ten Keys]

As is mentioned in connection with the setting manner of the detail records etc., an essential object of the function is as follows.

Usually, data entry operations are made with use of ten keys and function keys in the data terminal equipment.

According to the custom of the ordering service, for instance, the quantity of an article to be ordered is specified with a unit such as one dozen, one carton or the like which is usually determined depending on the property of the article and the store in which the article is dealt with. Also, there are many zeros in data with respect to the quantity in the stock management. In the case mentioned above, entry operations such as ten key "1"→function key→ten key "0"→function key are usually repeated. In such a case as mentioned above, entry operations will be much simplified if a number of "0" or "1" is automatically input only by pushing a function key without use of a ten key.

Figure 24:
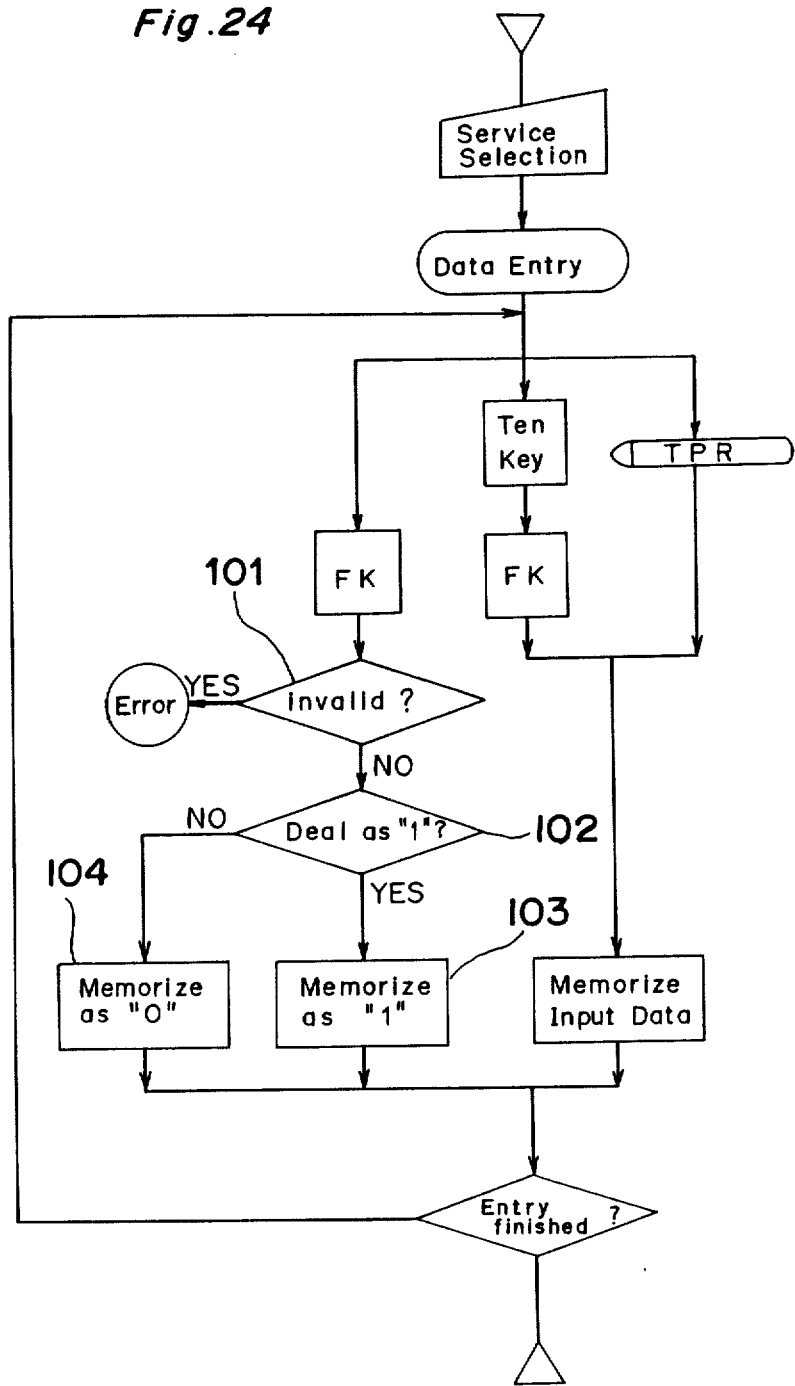
FIG. 24 is a flow chart showing the manner of omission of deposition by ten keys.

FIG. 24 shows a flow chart therefor. As is shown in FIG. 24, when one of the data entry jobs is chosen, data are entered with use of ten keys or through TPR and, then, a function key is usually operated. Instead of the usual data entry, a specified function key can be operated first without the operations of one or more ten keys.

If such an entry is designated to be invalid by parameters having been set in the parameter setting mode, then it is regarded as an error at step 101.

If such an entry is designated to be valid, then it is decided whether the entry is to be treated as the deposit of "1" or not a step 102. If decided "YES", then "1" is memorized at step 103. In the case of "NO", then "0" is memorized at step 104.

Such an omission of deposit is designated about every item of entry data. Therefore, it becomes possible to use the same function key as a key for omission of deposit among a variety of common data entry jobs. Accordingly, it becomes unnecessary to increase the number of function keys, key operations can be simplified, the entry speed can be made fast and possible entry mistakes can be avoided.

[Automatic Data Entry upon Skipping Entry]

Upon inputting record data such as a set of a maker code, an article code, a quantity of article, an amount of money and so on, for instance in the ordering service, there are some common data such as a maker code, an article code or the like among records. In the case that there are some common data among records, it is bothersome to enter these data at the entry operations of each record. Therefore, in the present system, it becomes possible to designate with respect to every item whether the data entry can be skipped according to designated parameters.

If it is designated with respect to one item that the data entry can be skipped, then the data of the corresponding item of the preceding record is automatically memorized as that of the present record when the skip of the data entry is made.

The setting conditions about the skip is possible by designating parameters at the item #01 in Table 3-1.

Figure 25:
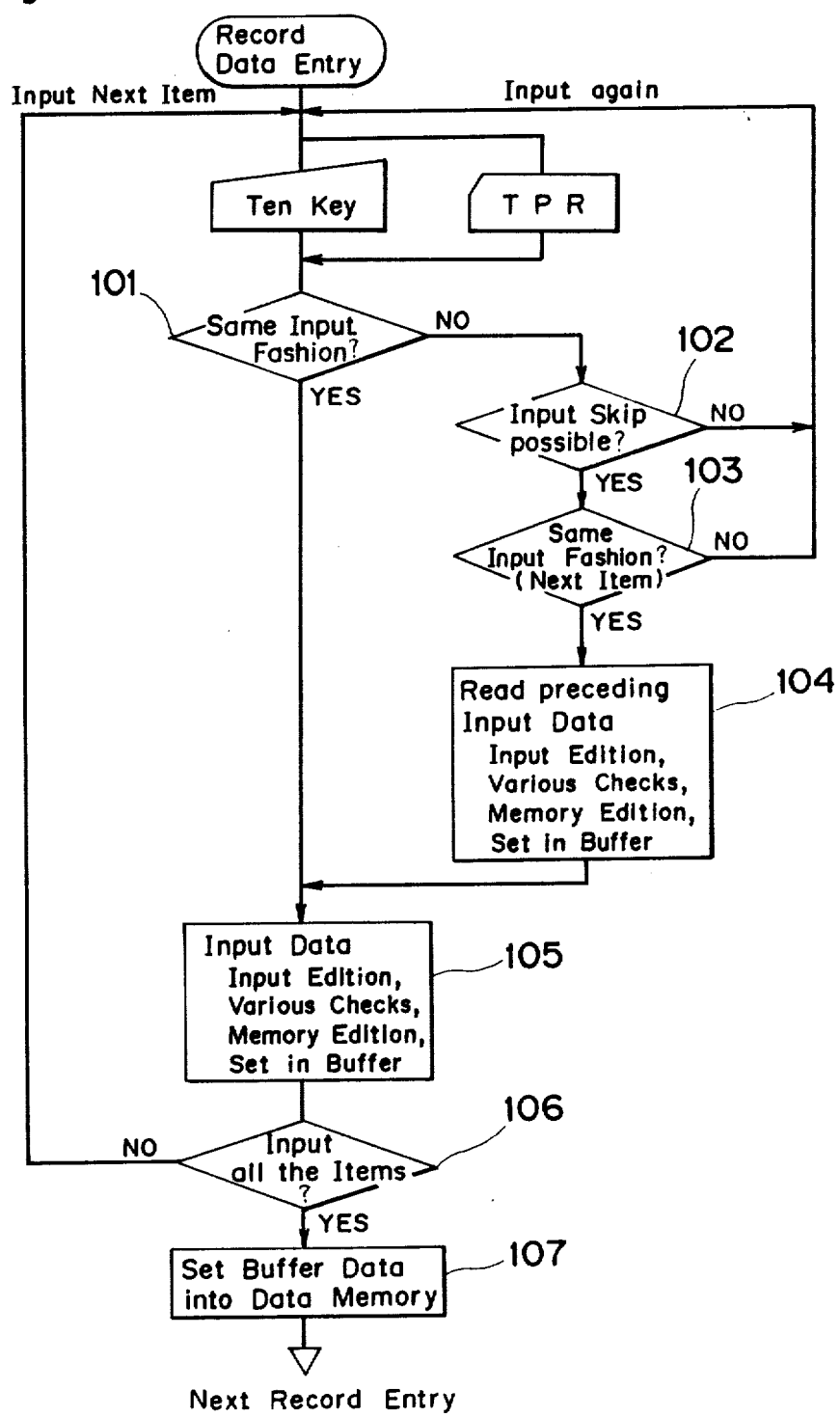
FIG. 25 is a flow chart showing the manner of skipping data entry.

FIG. 25 shows a flow chart for skipping data entry.

As shown in FIG. 25, when each item is input by ten keys or through TPR, it is decided at step 101, if the entry fashion corresponds to that designated about the item (See items #13 and #14 in Table 2). In the case of "NO", it is decided if the skip of data entry is possible at step 102. In the case of "YES", it is decided if the entry fashion corresponds to that of the next item at step 103. Namely, at this step 103, it is decided if the data entry with respect to the item next to the item to be skipped was done. In the csase of "NO", it is required to re-enter the data. In the case of "YES", the data of the corresponding item of the preceding record is read out and is set once in the buffer memory after executing the edition of the data, every check thereof and the edition of the memory at step 104. At the next step 105, the data of the skipped item having been edited is set in the buffer memory as the input data. Alternatively, if the entry is fashioned corresponding to that designated at step 101, then it is proceeded directly to step 105.

When the entry about all items of one record is completed (step 106), the entry data in the buffer memory is set in the data memory as one record at step 107 and, then, the data entry for the next record is done.

According to the function just mentioned above, the entry of the common data can be skipped to execute the next data entry. Therefore, the data entry operation is simplified, can be done fast and possible entry errors can be avoided.

[Automatic Assignment of Service Identification Code]

According to this function, when one of the data entry jobs for the stock management, the ordering service or the stock taking service etc. is chosen, the service identification code representing the kind thereof is automatically written on the data memory. The code is written at the timing that a job key for data entry is pushed down. The code is provided for identifying the kind of data in the case that the host machine accesses data entered at the side of the data terminal equipment and process data is accessed.

The digit length and content of the service identification code are set in the setting mode.

It is selectable whether the service identification code should be written on the data memory upon the data entry or not. In the case that it is to be written, the digit number (length) can be designated arbitrarily. The content thereof can be also designated arbitrarily within the digit number designated for every data entry job (See Tables 19 and 20).

According to the function mentioned above, a variety of entry data can be memorized in the data memory.

(1) Setting the Service Identification Code (1-1) Digit Number of the Code

If the function is not necessary, then "0" is designated as the system parameter therefor. If necessary, one digit of "1" to "8" is designated.

(1-2) Setting the Code

The service identification code is set by designating a code suitable for briefly representing the content of the service within the digit number designated.

(2) Processing Method (Execution Mode)

Figure 26:
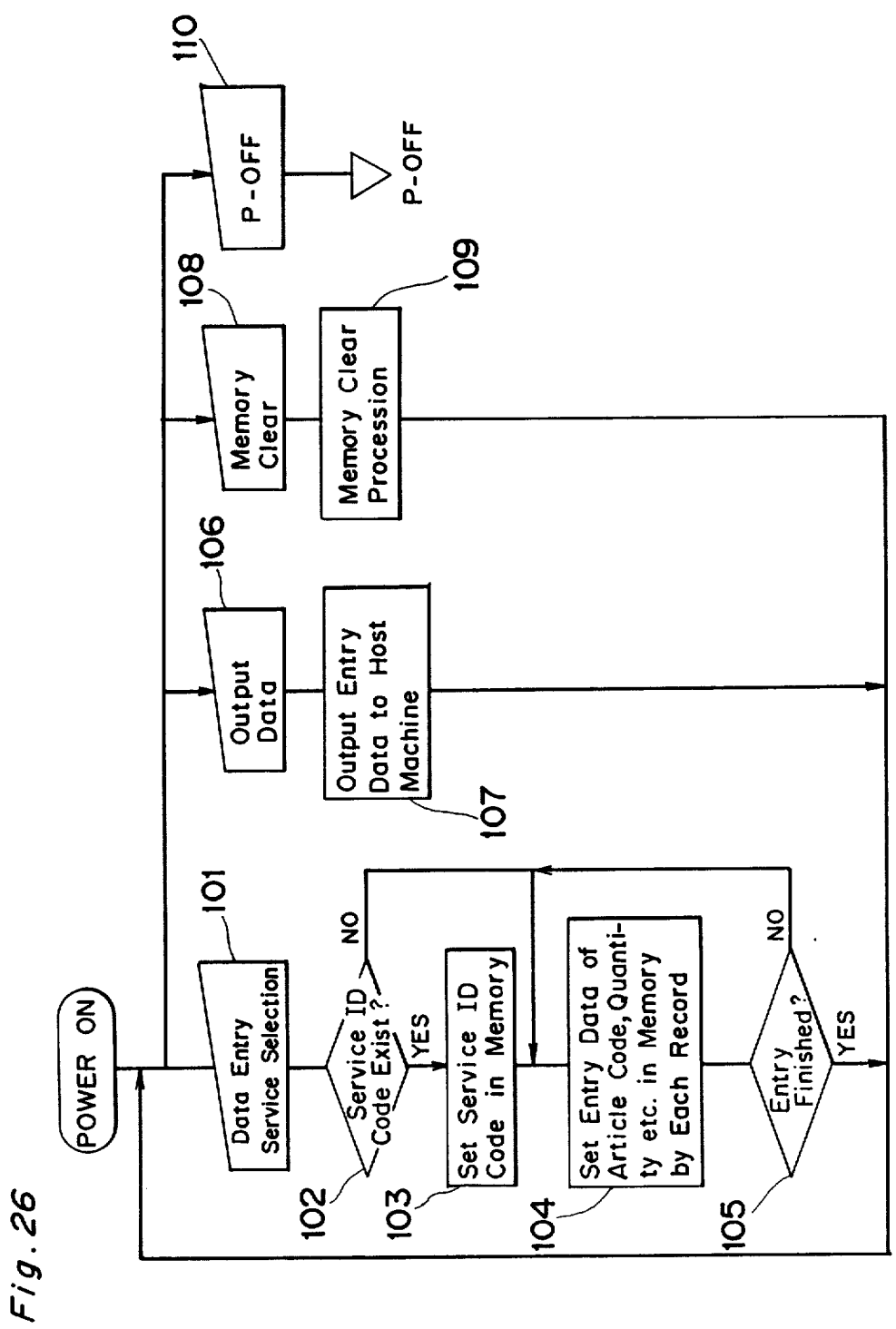
FIG. 26 is a flow chart showing the manner for giving service identification codes.

FIG. 26 shows a flow chart for processing the service identification code.

As shown in FIG. 26, when one of data entry jobs is chosen at step 101, it is decided whether the service identification code is designated or not at step 102. In the case that it is designated, it is set in the data memory at step 103. Therefore, the service identification code is automatically assigned to the head of each data being entered in this data entry job.

Then, at step 104, data relating to the data entry job are entered sequentially and data having been entered are set by one record unit in the data memory. The data entry is continued until the completion of the data entry is confirmed at step 105.

Contrary to the above, if the service identification code is not designated, then the step 103 is skipped and the data entry at step 104 is executed.

When the data entry job is completed, the next job, for instance the output of data to the host machine is started.

The data output job is chosen at step 106, the entry data memorized in the data memory are output to the host machine at step 107. Since the service identification code is output at first as a heading data upon the data output if it is designated, then the kind of service with respect to data being input can be easily identified at the side of the host machine and, therefore, the sort or arrangement of data can be done advantageously.

When the data output is completed, the memory clear job is designated at step 108 and the data in the data memory are cleared at step 109.

After these jobs are completed, the power is turned off at step 110.

[Scroll Up of Data Displayed]

There are a variety of data entry jobs for ordering, stock management, etc. The number of items, the type of data, the entry fashion and the display format are different from each other among those jobs. Accordingly, there may be cases in which it is impossible to scroll up the data being displayed depending on the display format designated. Or, there may be cases in which it is better to clear the entry data when the entry is completed in order to avoid unclearness on the display.

Further, the extent and/or the line to be scrolled up should be varied according to the display format.

The scroll up function according to the present system is improved so as to be available for an arbitrary display format by changing parameters related thereto.

Figures 27, 28:
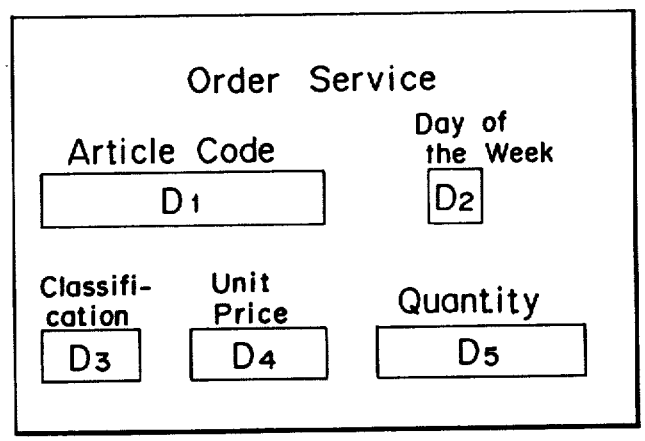
FIG. 27 is a schematic front view showing an example of display without designation of "scroll up" function.
FIG. 28 is a schematic front view showing an example of display with use of the scroll up function.

FIG. 27 shows an example of the display of the entry data for the ordering service in which the scroll up function is not designated FIG. 28 shows an example of the display of the entry data for the stock management in which each data entered is scrolled up in turn.

In the example shown in FIG. 27, a set of guide texts such as "ORDERING SERVICE", "ARTICLE CODE", "A DAY OF THE WEEK", "CLASSIFICATION", "UNIT PRICE" and "QUANTITY" are displayed in a fixed manner. Data are entered in the order of the article code $D_1$, a day of the week $D_2$, the classification $D_3$, the unit price $D_4$ and the quantity $D_5$. When the entry of these data $D_1$ to $D_5$ is once completed, all these data $D_1$ to $D_5$ are cleared from the display.

In the example shown in FIG. 28, a set of guide texts such as "STOCK MANAGEMENT", "ARTICLE CODE", "UNIT PRICE", and "QUANTITY" are displayed in a fixed manner, and however, the fourth to eighth lines are reserved for displaying the entry data.

Data are entered in the order of the article code $D_n$, unit price $D_m$ and quantity $D_l$. The set of these data $D_n$, $D_m$ and $D_l$ is displayed on the lowermost line (the eighth line). The set of data $D_{n-1}$, $D_{m-1}$ and $D_{l-1}$ entered prior to the set of $D_n$, $D_m$ and $D_l$ is scrolled up from the eighth line to the seventh line. And also each proceding set of data $((D_{n-2}, D_{m-2}, D_{l-2}), \ldots, (D_{n-4}m\ D_{m-4}, D_{l-4}))$ is scrolled up by one line on the display.

This scroll up function is designated in the program setting mode and is effected in the execution mode.

Figure 29:
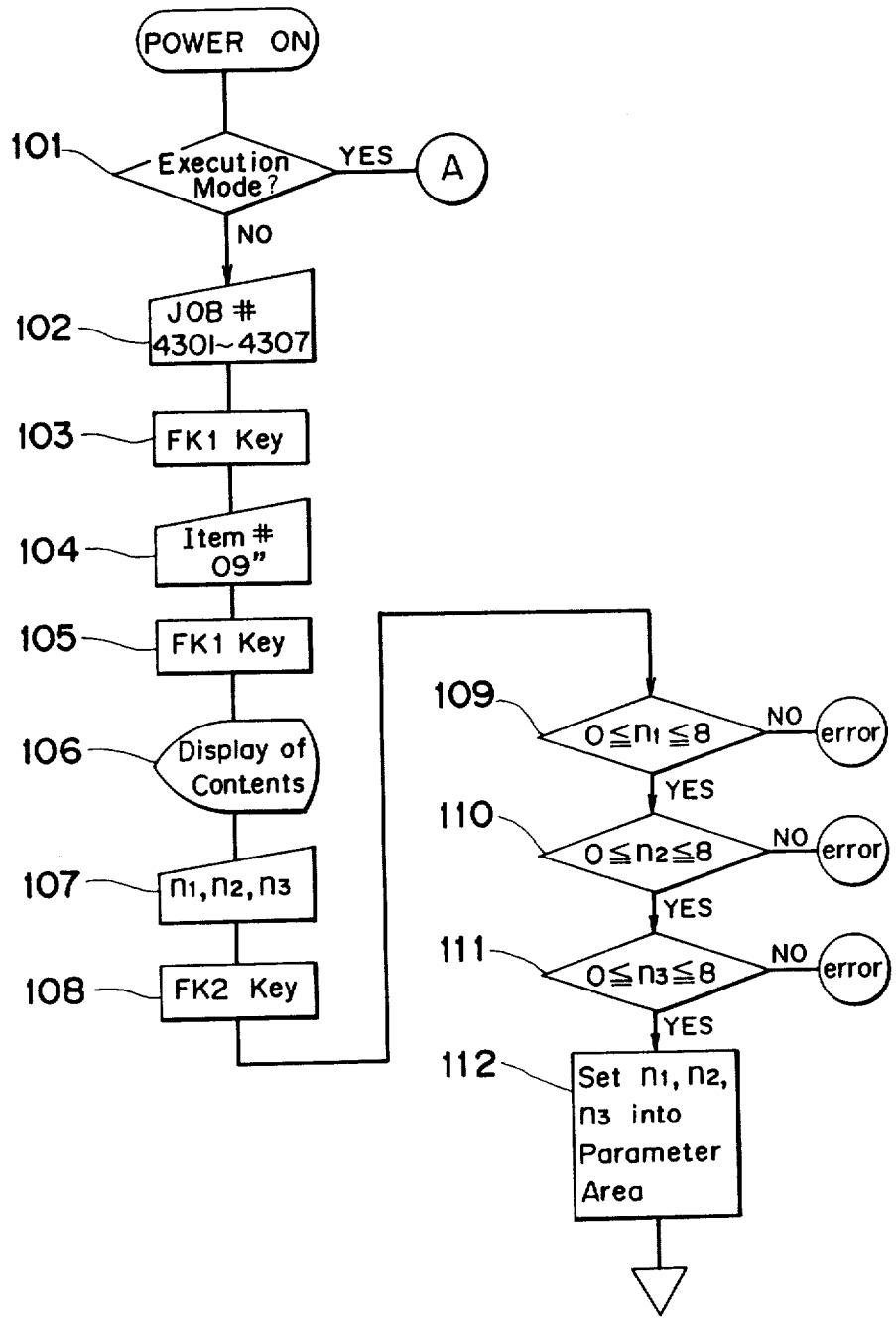
FIG. 29 is a flow chart showing the setting manner about the scroll up function.
Figure 30:
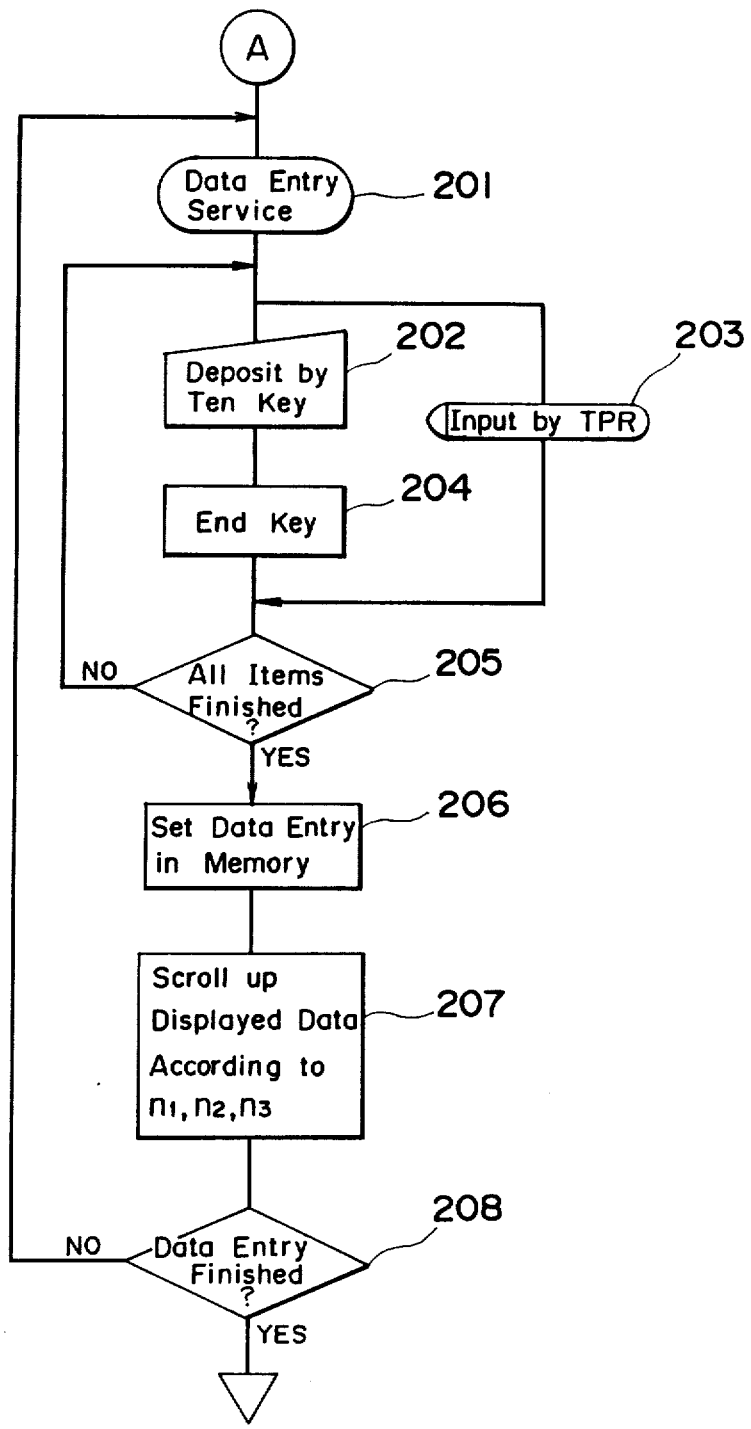
FIG. 30 is a flow chart showing the execution of the scroll up.

FIG. 29 shows a flow chart for program setting and FIG. 30 shows a flow chart for effecting the scroll up function.

At first, the designation thereabout will be explained according to FIG. 29.

As shown in FIG. 29, when the power is turned on, it is decided if the mode is the execution mode or not at step 101. In the case of the setting mode, one job number "4301" is designated among jobs (JOB#4301 to 4307) for designating a fashion of the scroll up to step 102.

As is clear from Table 13, since the item #09 is related to the scroll up function, the function key FK1 is operated at step 103 and, then, "09" is deposited with use of ten keys at step 104.

When the function key FK1 is pushed again at step 105, the contents of the preceding setting are displayed at step 106. Then, numerals "$n_1$, $n_2$, $n_3$" are deposited with use of ten keys wherein $n_1$ is the parameter for designating the number of lines by which the data is scrolled up, $n_2$ is the parameter for designating the line number which defines the upper limit of the area being able to scroll up and $n_3$ is the parameter for designating the line number which defines the lower limit of the area. In the example shown in FIG. 28, the parameters $n_1$, $n_2$ and $n_3$ are set equal to "1", "4" and "8" respectively.

In the case that the scroll up function is not needed, all of these parameters $n_1$, $n_2$ and $n_3$ are set equal to "0".

Then, the function key FK2 is pushed at step 108. At steps 109 to 111, each parameter $n_1$, $n_2$ and $n_3$ is checked whether it is within the allowable extent for scroll up or not (In the example shown, the maximum of each parameter is set equal to 8).

The parameter setting as mentioned above can be done about each of seven jobs from JOB#4301 to JOB#4307. In other words, the fashion or format of the scroll up is able to set with respect to each of seven data entry jobs.

Next, the scroll up function in the execution mode will be explained according to FIG. 30.

When one of the data entry jobs is designated together with the job number thereof at step 201, data entry is done with use of ten keys at step 202 or through TPR at step 203. In the case that ten keys are used therefor, the end key is pushed down after the completion of the data entry at step 204. The data entry is continued until the completion of the data entry of all the items designated at item #06 in Table 13 is confirmed at step 205. When the data entry about one set of the items is finished, the entry data are set in the memory at step 206. Then, at step 207, parameters set at item #09 of the corresponding job number are read out and it is decided if the scroll up function is designated. In the case that it is designated, the data displayed are scrolled up in the fashion specified by parameters $n_1$, $n_2$ and $n_3$ at step 207. This process is repeated until the completion of all data entry is confirmed at step 208.

With respect to guide texts to be displayed in a fixed manner, they are designated respectively at items #1 to #3 in Table 13.

[Automatic Transmission]

In the conventional data terminal equipment, the key for transmission is provided. The transmission of data from the data terminal equipment to the host machine is started by the operation of the transmission key.

However, the provision of the transmission key is impossible in the data terminal wherein the number of keys are restricted or there is a possibility of error operations in the data terminal where the transmission key is provided. Further, steps to be taken upon the data transmission such that one connect the cable to the data terminal first and, thereafter, the transmission key should be pushed down, are complicated for an unexperienced person.

According to the present system, there is provided [Automatic Transmission] function which makes the transmission start automatically when the cable is connected to the data terminal. This function is selectable depending on whether the transmission key is provided or not. Although the function may not be necessary in the case that the transmission key is provided, it becomes necessary in the case that the transmission key is not provided.

In other words, either one of the following two fashions (a) and (b) for starting the transmission is available to choose according to the type of the data terminal;

(a) the data transmission is automatically started when the cable for transmission is connected to the data terminal in order to transmit data having been entered into the data terminal to the host machine or another data terminal;

(b) the data transmission is started only when the transmission key is operated in the case that the transmission key is provided.

With respect to the job for transmission, parameters are set in the program setting mode as follows.

(a) Setting Parameters (a-1) Designation of the Function

The automatic transmission is designated by the numeral code "00" and the manual transmission is designated by one key code of "01" to "20".

(a-2) Format of Data Output

The format of data output can be designated only by one of the formats defined in Table 17.

(a-3) Judgment about Normal Ending

In the case that "GP4BTS" is designated in the Table 17, the transmission of data is automatically regarded as completed when all the data memorized have been output.

In the case that one of the data output formats other than "GP4BTS" is designated, the completion of the data transmission is decided only when the ending data being defined in Table 18 is received.

(b) Execution Mode

Figure 31:
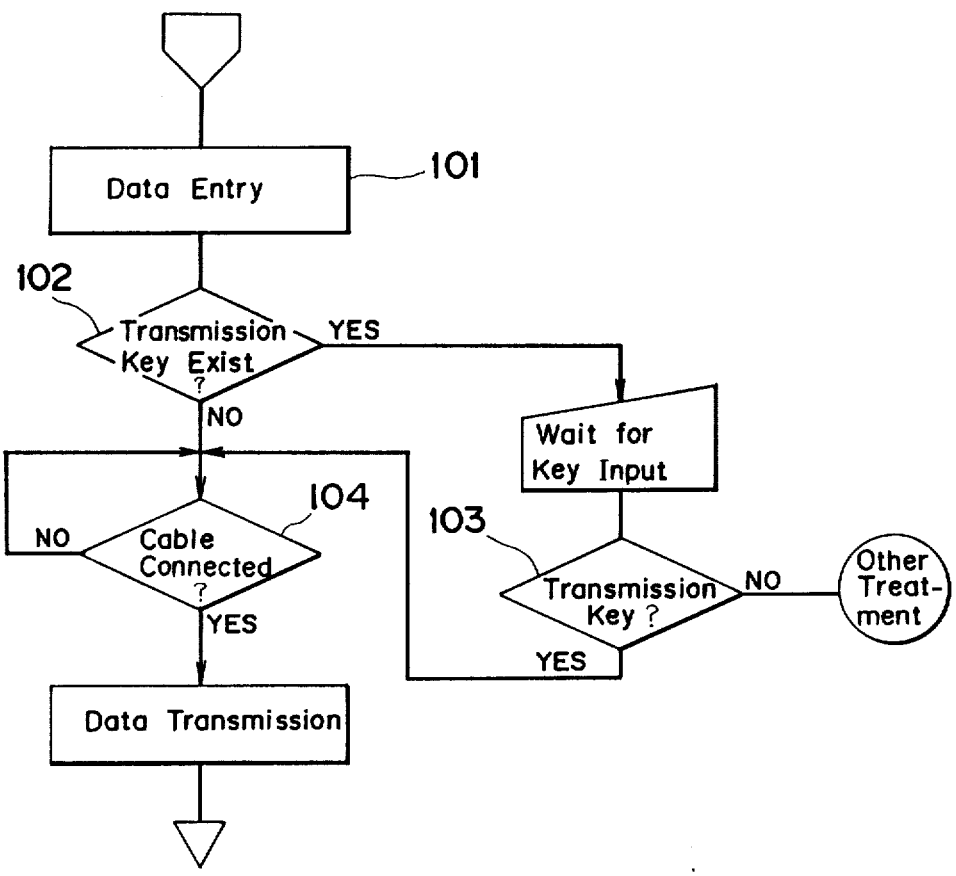
FIG. 31 is a flow chart showing the data transmission to the host machine or other data terminal.

FIG. 31 shows a flow chart for the data transmission in the execution mode. As is shown in FIG. 31, when one of data entry jobs have been completed at step 101, it is decided at step 102 whether the transmission key is provided or not. In the case that it is provided, it is decided if the key operated is the transmission key or not at step 103.

When the transmission key is operated correctly, it is decided, at step 104, if the connection cable is connected correctly between the data terminal and the host machine.

In the case that the transmission key is not designated, namely the automatic transmission is designated, they proceed directly from step 102 to step 104 and are judged if the connecting cable is connected correctly or not.

When the correct connection of the cable is confirmed at step 104, the data transmission to the host machine is started.

According to the function mentioned above, it is possible to select either the automatic transmission or the manual transmission with use of the transmission key. In the case of the automatic transmission, the transmission key becomes unnecessary and, therefore, operations for data transmission can be simplified.

TABLE 1

| System SW.1 | System SW.2 | Mode SW. | Mode | | | | |
|---|---|---|---|---|---|---|---|
| A | A | — | DIAG | | | | |
|   | B | — | UNDEFINE | | | | |
|   | C | A | LOAD FROM HOST | | | | |
|   |   | B | LOAD FROM OTHER TERMINAL | | | | |
| B | A | — | APPLICATION (Program Mode) | | | | |
| C | A | — | APPLICATION (Execution Mode) | | | | |
| B | B | A | O | X | X | UNLOAD | |
|   |   | B | X | X | X | | |
|   | C | A | O | O | X | | |
|   |   | B | X | O | X | | |
| C | B | A | O | X | O | | |
|   |   | B | X | X | O | | |
|   | C | A | O | O | · O | | |
|   |   | B | X | O | O | | |
|   |   |   | DATA PROGRAM1 | DATA | PROGRAM2 | | |

UNLOAD Mode
O: UNLOAD
X: Not UNLOAD
PROGRAM 1: Standard Program
PROGRAM 2: Optional Program
DATA: Parameter

TABLE 2

| Item # | Setting Item | | JOB# | 0101 | 0102 | 0103 ... Title of Item | 0113 | 0114 |
|---|---|---|---|---|---|---|---|---|
| 10 | Item Length | Length on Data Memory including Item Partition Code (01~05) | | | | | | |
|  | Display area Line | 01~08 | | | | | | |
|  | Digit | 01~24 | | | | | | |
|  | Digit Length | 01~24 | | | | | | |
|  | Item Partition Code | 00: None.4BIT: 30~39, 41, 43~45$_H$ 8BIT: 20~7F, AO~DF$_H$ | | | | | | |
|  | Input finishing Key | Input finished only when Calendar is read; available to set "No Keys" (OO) | | | | | | |
|  | Read Calendar | O: None 1: Date 2: Time 3: Date and Time | | | | | | |
|  | TPR Input | O: None 1: Exist | | | | | | |

| Item # | Setting Item | | JOB# | 0101 | 0102 | 0103 ... Title of Item | 0113 | 0114 |
|---|---|---|---|---|---|---|---|---|
| 11 | Checking Method 1 | 0000: No Check 0001: Date Check 0002: Time Check | | 0\|0\|0\|0 | 0\|0\|0\|0 | 0\|0\|0\|0 | 0\|0\|0\|0 | |
|  | 2 | 0003: Date & Time Check 1000: 0 Check ("0" means error) 20nn: Extent Check | | 0\|0\|0\|0 | 0\|0\|0\|0 | 0\|0\|0\|0 | 0\|0\|0\|0 | |
|  | 3 | nn: Extent Table (01~10) 3mnn: C/D Check m: C/D Table (1~6) | | 0\|0\|0\|0 | 0\|0\|0\|0 | 0\|0\|0\|0 | 0\|0\|0\|0 | |
|  | 4 | nn: Item to be added 00: None 01~07: H Item 4000: Comparison Check with Initial Setting Memory | | 0\|0\|0\|0 | 0\|0\|0\|0 | 0\|0\|0\|0 | 0\|0\|0\|0 | |
|  | 5 | 50nn: Sum Check nn: Totalizer (01~04) 6000: Master Data Search Check | | 0\|0\|0\|0 | 0\|0\|0\|0 | 0\|0\|0\|0 | 0\|0\|0\|0 | |

| Item # | Setting Item | | JOB# | 0101 | 0102 | 0103 ... Title of Item | 0113 | 0114 |
|---|---|---|---|---|---|---|---|---|
| 12 | Memory Edit. Method (Dummy) | 00: Decimal Point 10: Delete Last Digit 2n: C/D addition (n:C/D Table 1~6) | | 0\|0 0\|0 | 0\|0 0\|0 | 0\|0 0\|0 | 0\|0 0\|0 | 0\|0 0\|0 |

TABLE 2-continued

| | | | | | | | | |
|---|---|---|---|---|---|---|---|---|
| | Use of Totalizer | | 00: No use 01~04: For saving 11~14 For addition (1~4: Totalizer No) | 0 \| 0 | 0 \| 0 | 0 \| 0 | 0 \| 0 | 0 \| 0 |
| 13 | Ten Key Input | Total number of digits (Dummy) | Only Input of Positive Integer Available | | | | | |
| | | | | 0 \| 0 | 0 \| 0 | 0 \| 0 | 0 \| 0 | 0 \| 0 |
| | | Input Mode | 0: Fixed Digit 1: Variable Digit | | | | | |
| | | Omission of | 0: Unavailable 1: Available (regard as "0" Input | | | | | |
| | | Deposit | 2: Available (regard as "1"Input) 00: Flush Right | | | | | |
| | | Input Edition | 30~39: Filler Code upon flushing to the Left | | | | | |
| 14 | TPR Input (Dummy) | | | 0 | 0 | 0 | 0 | 0 |
| | TPR Input (1 Scan) | | 0:No TPR Input 1~8:TPR Input Table No | 0 | 0 | 0 | 0 | 0 |

TABLE 3-1

| Item # | Setting Item | | JOB # | 0201 | 0202 | 0203 | ... | 0215 | 0216 |
|---|---|---|---|---|---|---|---|---|---|
| | | | | | | Title of Item | | | |
| 01 | Codition of Input | | 0: necessary 1: necessary only Once 2: Conditional Input | 0 | 0 | 0 | | 0 | 0 |
| | Object of Condition | | 0: Input Value 1: Digit number of Input | 0 | 0 | 0 | | 0 | 0 |
| | Item No. Referred | | 01~08:H Item 11~19:D Item | 0\|0 | 0\|0 | 0\|0 | | 0\|0 | 0\|0 |
| | Condition of Decision | | 0: = 1:Value Set>Referring Item 2:< | 0 | 0 | 0 | | 0 | 0 |
| | Procession on Matching | | 0:Skip Input 1:Input | 0 | 0 | 0 | | 0 | 0 |
| | Filler Code on | | 4BIT:30~39, 41~45$_H$ | | | | | | |
| | Input Skipping | | 8BIT:20~7F, AO~DF$_H$ | 0 \| 0 | 0 \| 0 | 0 \| 0 | | 0 \| 0 | 0 \| 0 |
| | Digit Number of | TenKey | 01~13 | 0 \| 0 | 0 \| 0 | 0 \| 0 | | 0 \| 0 | 0 \| 0 |
| | Object of Condition | TPR | 01~24 | 0 \| 0 | 0 \| 0 | 0 \| 0 | | 0 \| 0 | 0 \| 0 |
| | Number of Columns of 10 Key Input | | 1~4 | | | | | | |
| | Number of Columns of IPR Input | | 0~2 0: No TPR Input | | | | | | |
| 02 | Value of Object of Condition | | Positive Integer and within 13 Digits | | | | | | |

| Item # | Setting Item | JOB # | 0201 | 0202 | 0203 | ... | 0215 | 0216 |
|---|---|---|---|---|---|---|---|---|
| | | | | | Title of Item | | | |
| 10 | Item Length | Data Length including I.P.C. (01~17) | | | | | | |
| | Display Area Line | 01~08 | | | | | | |
| | Digit | 01~24 | | | | | | |
| | Digit Length | 01~24 | | | | | | |
| | Item Partition Code | 00:None 4BIT:30~39,41,43~45$_H$ 8BIT:20~7F,AO~DF$_H$ | | | | | | |
| | Input Finishing Key | Input finished only when Calendar is read; available to set "No Keys"(00) | | | | | | |
| | Reading Calendar | 0:None 1:Date 2:Time 3:Date and Time (Day of the Week) | | | | | | |
| | TPR Input Method | 0:None 1:1 Scan 2:Preceding Scan Data 3:Plural Scan | | | | | | |

| Item # | Setting Item | | JOB # | 0201 | 0202 | 0203 | 0215 | 0216 |
|---|---|---|---|---|---|---|---|---|
| | | | | | | Title of Item | | |
| 11 | Checking Method | 1 | 0000: No Check 0001: Date Check 0002: Time Check | 4000: Comparison Check with Initial Se- | | | | |
| | | | | tting | | | | |
| | | | 0003: Date & Time Check | | | | | |
| | | 2 | 1000: 0 Check ("0≠ means error) | 50nn: Sum Check | 0\|0\|0\| 0\|0\|0\| 0\|0\|0\| 0 | 0\|0\|0\| 0\|0\|0\| 0\|0\|0\| 0 | 0\|0\|0\| 0 | 0\|0\|0\| 0\|0\|0\| 0 | |
| | | | | nn: Totallzer | | | | |
| | | 3 | 20nn: Extent Check nn: Extent Table (01~10) | (01~04) 6000: Master Data Search Check | 0\|0\|0\| 0\|0\|0\| 0\|0\|0\| 0 | 0\|0\|0\| 0\|0\|0\| 0\|0\|0\| 0 | 0\|0\|0\| 0 | 0\|0\|0\| 0\|0\|0\| 0 | |
| | | 4 | 3mnn: C/D Check m: C/D Table | 7000: Data Registra- tion | 0\|0\|0\| 0\|0\|0\| 0\|0\|0\| 0 | 0\|0\|0\| 0\|0\|0\| 0\|0\|0\| 0 | 0\|0\|0\| 0 | 0\|0\|0\| 0\|0\|0\| 0 | |

TABLE 3-1-continued

| | 5 | nn: Item to be added<br>00:None 01~08 H<br>11~19:D Item | Check<br>Item | 0\|0\|0\| 0\|0\|0\| 0\|0\|0\|<br>    0       0       0 | 0\|0\|0\| 0\|0\|0\|0<br>   0 |

TABLE 3-2

| | | Item | JOB # | 0201 | 0202 | 0203 | ... | 0215 | 0216 |
|---|---|---|---|---|---|---|---|---|---|
| # | | Setting Item | | | | Title of Item | | | |
| 12 | Memory Editorial Method | 00~02:Position 8 Digit Number of Decimal Fraction<br>10:Deletion of Last Digit<br>2n:C/D Addition (n:C/D Table 1-6)<br>30:Addition of Other Items | | 0\|0 | 0\|0 | 0\|0 | | 0\|0 | 0\|0 |
| | No. of Item to be added | 01~08:H Item 11~19:D Item | | 0\|0 | 0\|0 | 0\|0 | | 0\|0 | 0\|0 |
| | Use of Totalizer | 00:Unused<br>11~14:For Addition (1-4 Totalizer No.) | | 0\|0 | 0\|0 | 0\|0 | | 0\|0 | 0\|0 |

| Item # | | | Setting Item | JOB # | 0201 | 0202 | 0203<br>Title of Item | ... | 0215 | 0216 |
|---|---|---|---|---|---|---|---|---|---|---|
| 13 | Ten Key Input 1 | Total No. of Digits<br>Digit No. of Decimal Fraction<br>Input Mode<br>Omit. Deposit<br>Edition of Input | 01~13<br>00~02<br><br>Input Mode<br>0:Fixed Digit (Positive Integer Only)<br>(-,.)Unavailable)<br>1:Variable Digit(Positive Integer Only;(-,.)Unavailable) | | \| | \| | \| | | \| | \| |
| | Ten Key Input 2 | Total No. of Digits<br>Digit No. of Decimal Fraction<br>Input Mord<br>Omit. Deposit<br>Edition of Input | 2:Variable Digit(Integer,(-) available;(.)unavailable)<br>3:Variable Digit(Positive Real number Only;(-)unavailable<br>4:Variable Digit (Real Number; (-,.)Available)<br>Omission of Ten Key Deposition<br>0:Unavailable | | \| | \| | \| | | \| | \| |
| | Ten Key Input 3 | Total No. of Digits<br>Digit No. of Decimal Fraction<br>Input Mode<br>Omit. Deposit<br>Edition of Input | 1:Available (regard as 0 input)<br>2:Available (regard as 1 input)<br><br>Input Edition<br>00:Flush Right<br>30~39:Filler Code on Flushing Left (HEX) | | \| | \| | \| | | \| | \| |
| | Ten Key Input 4 | Total No. of Digits<br>Digits No. of Decimal Fraction<br>Input Mode<br>Omit. Deposit<br>Edition of Input | 01~13:Beginning Digit from which Preceding Data is replaced. | | \| | \| | \| | | \| | \| |

| Item # | | Setting Item | JOB # | 0210 | 0202 | 0203<br>Title of Item | ... | 0215 | 0216 |
|---|---|---|---|---|---|---|---|---|---|
| 14 | TPR Input (One Scan) 1 | 0~8:TPR Input Table No. | | 0 | 0 | 0 | | 0 | 0 |
| | TPR Input (One Scan) 2 | 1~8:TPR Input Table No. | | 0 | 0 | 0 | | 0 | 0 |
| 15 | Condition of Input Ending<br>of TPR Input (Plural Scan) | 0:TPR Input or Key Input not Designated<br>1:TPR Input except 0~9 | | 0 | 0 | 0 | | 0 | 0 |
| | TPR Input (Plural Scan) | 1~8:TPR Input Table No. | | 0 | 0 | 0 | | 0 | 0 |

TABLE 4

| Item # | | Setting Item | JOB # | 0301 | 0302 | 0303<br>Title of Item | 0304 |
|---|---|---|---|---|---|---|---|
| 10 | Display Area Line | Length on Data Memory including Item Partition Code (01~19) | | \| | \| | \| | \| |
| | Digit | 01~08 | | \| | \| | \| | \| |
| | Length of Digit | 01~24 | | \| | \| | \| | \| |
| | Item Partition Code | 00:None 4BIT:30~39,41,43<br>$45_H$8BIT:20~7F,AO~DF$_H$ | | \| | \| | \| | \| |
| | Input Finishing Key or Function Key | Hard Code (01~20) | | | | | |
| | (Dummy) | | | 0 | 0 | 0 | 0 |

TABLE 4-continued

| | | | (Dummy) | 0 | 0 | 0 | 0 |
|---|---|---|---|---|---|---|---|
| Item # | Setting Item | | JOB # | 0301 | 0302 | 0303 | 0304 |
| | | | | | Title of Item | | |
| 11 | Checking Method | 1 | | 0\|0\|0\|0 0 | 0\|0\|0\|0 0 | 0\|0\|0\|0 0 | 0\|0\|0\|0 |
| | | 2 | | 0\|0\|0\|0 0 | 0\|0\|0\|0 0 | 0\|0\|0\|0 0 | 0\|0\|0\|0 |
| | | 3 | | 0\|0\|0\|0 0 | 0\|0\|0\|0 0 | 0\|0\|0\|0 0 | 0\|0\|0\|0 |
| | | 4 | | 0\|0\|0\|0 0 | 0\|0\|0\|0 0 | 0\|0\|0\|0 0 | 0\|0\|0\|0 |
| | | 5 | | 0\|0\|0\|0 0 | 0\|0\|0\|0 0 | 0\|0\|0\|0 0 | 0\|0\|0\|0 |
| 12 | Digit Number of Decimal Fraction | 00~02 | | \| | \| | \| | \| |
| | Memory of Sign Code on Data Memory | 0:Not Memorize 1:Memorize | | | | | |
| | (Dummy) | | | 0 | 0 | 0 | 0 |
| | Totalizer NO. | 01~04 | | \| | \| | \| | \| |
| | 10 Key Number of Digits | 01~16 | | \| | \| | \| | \| |
| 13 | Input Digit No. of Decimal Fraction | 00~02 | | \| | \| | \| | \| |
| | Input Code | Input Code 0:Fixed Digit (-,.unavailable) 1:Variable Digit | | | | | |
| | Dummy | (-,.unavailable) 2:Variable Digit (-Available, unavailable) 3:Variable Digit (-unavailable Available) | | 0 | 0 | 0 | 0 |
| | (Dummy) | 4:Variable Digit | | 0 \| 0 | 0 \| 0 | 0 \| 0 | 0 \| 0 |
| | | (-,.available) | | | | | |

TABLE 5

| Item # | Setting Item | | JOB # | 0601 | 0602 | 0603 | 0604 | 0605 | 0606 | 0607 | 0608 | 0609 | 0610 |
|---|---|---|---|---|---|---|---|---|---|---|---|---|---|
| | | | | | | | Title of Item to be Checked | | | | | | |
| 01 | Upper Limit | Each Digit 0~9 Maximum 10 Digit | | \| | \| | \| | \| | \| | \| | \| | \| | \| | \| |
| 02 | Lower Limit | Each Digit 0~9 Maximum 10 Digit | | \| | \| | \| | \| | \| | \| | \| | \| | \| | \| |
| 03 | Starting Position of Check | 00~13 00:All the Input Data | | \| | \| | \| | \| | \| | \| | \| | \| | \| | \| |
| | Length of Check | 01—10 | | \| | \| | \| | \| | \| | \| | \| | \| | \| | \| |

TABLE 6

| Item # | Setting Item | | JOB # | 0401 | 0402 | 0403 | 0404 | 0405 | 0406 |
|---|---|---|---|---|---|---|---|---|---|
| | | | | | | Title of Item | | | |
| 01 | Starting Position of C/D calculation | 01~23 | | \| | \| | \| | \| | \| | \| |
| | Length of C/D calculation | 01~23 | | \| | \| | \| | \| | \| | \| |
| | Kind of C/D calculation | 00~06 | | \| | \| | \| | \| | \| | \| |
| 02 | Weight | each digit 0~9 maximum 10 digits | | \| | \| | \| | \| | \| | \| |

TABLE 6-continued

| Item # | Setting Item | JOB # | 0401 | 0402 | 0403 | 0404 | 0405 | 0406 |
|---|---|---|---|---|---|---|---|---|
| | | | | | Title of Item | | | |

Kinds of C/D
00: Modulus 10-1
01: Modulus 10-2
02: Modulus 11-1
03: Modulus 11-2
04: Modulus 11-3
05: Modulus 11-4
06: Modulus 11-5

TABLE 7

Setting Key Data in Input Data
(Common to each Data Entry)

| Setting Item | Contents |
|---|---|
| Position of the Beginning Digit | Group of Detail Record is searched from the top thereof with Key Data being defined in this Table. |
| Length | |

Input Data deals only with positive integer.

TABLE 8

Setting Format of Master Registration Memory (Common to each Data Entry)

| Position of the Beginning Digit of First Record | Position of Beginning Digit from Top of Master Registration Memory (Sometimes there is no Header) |
|---|---|
| Length of One Record Position of Key Data in Master Memory (Position of the Beginning Digit in One Record) | Position of the Beginning Digit from Top of One Record |

TABLE 9

| JOB # | ITEM # | Setting Item | | Setting Data |
|---|---|---|---|---|
| 4001 | 20 | Key Data in Input Data | Beginning Digit | 01–13 | |
| | | | Digit Length | 01–13 | |
| | | Beginning Digit of First Record of Master | | 001–999 | |
| | | Record Length of Master | | 001–999 | |
| | | Beginning Digit of Key on Records | | 001–999 | |
| | | Treatment when not in master | | 0: Error, 1: Neglect |

TABLE 10

| JOB # | ITEM # | Setting Item | Title of Item | | | | | | | | |
|---|---|---|---|---|---|---|---|---|---|---|---|
| 4001 | 21 | Item Length | 01~24 | | | | | | | | |
| | | Edit. on Display | 0: X···X 1: Z···9 2: Z···9.9 3:···9.99 | | | | | | | | |
| | | Beginning Digit of Item | 001~999 | | | | | | | | |

TABLE 11

| Input Item | For Saving | For Adding | For Input | For Checking between Input Datum | For Checking between Totalizers |
|---|---|---|---|---|---|
| Item of Heading | O | O | X | O | X |
| Item of Detail | X | O | X | O | X |
| Item of Footing | X | X | O | O | O |

TABLE 12

| Item # | Settling Item | | JOB # | 0501 | 0502 | 0503 | 0504 | 0505 | 0506 | 0507 | 0508 |
|---|---|---|---|---|---|---|---|---|---|---|---|
| | | | | | | | Title of Item | | | | |
| 01 | Readable Length of Digit Before Starting | 0~24 | | | | | | | | | |
| | Valid Data Length of Valid Data | 01~24 | | | | | | | | | |
| | | 01~13 | | | | | | | | | |
| | Partition Code | 00: No 30~39:Partition 0~9 | | | | | | | | | |
| 02 | Input Edition | 00: Flush Right 30~39|Filler Code(H)Flushing Left 01~13: Beginning Digit from which Preceding Data is replaced. | | | | | | | | | |
| 03 | Kinds of Bar Code | 0: NW7 1:JAN 2:2 out of 5 3:ITF | | | | | | | | | |
| | Kinds of C/D | 0: NO C/D 1~6:C/D Table No. | | | | | | | | | |
| | Decimal Value of −Data | 00~99 | | | | | | | | | |
| | Decimal Value of +Data | 00~99 | | | | | | | | | |
| | Decimal Value of ±Data | 00~99 | | | | | | | | | |

TABLE 13

| JOB # | ITEM # | Setting Mode | | | Displaying Line | | | | | | | | | | | Guide Message (Input each by HEX Input 20–7F, A0–DF$_H$) |
|---|---|---|---|---|---|---|---|---|---|---|---|---|---|---|---|---|
| 4301 Title of Entry | 01 | Guide Message 1 | | | | | | | | | | | | | | 00: NO Display 01–08: Display after clearing 11–18: Display with the Previous Data |
| | 02 | Guide Message 2 | | | | | | | | | | | | | | |
| | 03 | Guide Message 3 | | | | | | | | | | | | | | |
| | 05 | Constant Data | | | | | | | | | | | | | | [00: None 4BIT: 30~39, 41, 4318 45$_H$ 8BIT: 20~7F, DF$_H$] |
| | 06 | Input Item (01–16) | | | | | | | | | | | | | | Select from Detail Item Tape |
| | 09 | Display after Inputting Item | | | 000: $H_1:H_2:H_3$: | | | | | Turn off Display of Input Item after Inputting all Items Scroll up after Inputting all Items | $H_1$: Nos. of Lines to be scrolled up | | $H_2$: Line No. of Uppermost Line | | $H_3$: | Line No. of Lowermost Line |
| | 21 | Master Display on Master Check | Field of Display | Item No. Line | 1 00 | 2 00 | 3 00 | 4 00 | 5 00 00 | 6 00 00 | 00 | 8 00 00 | 9 00 00 | 10 00 00 | | |
| | | | | Digit | 00 | 00 | 00 | 00 | 00 | 00 | | 00 | 00 | 00 | | |
| | | | | Digit Length | 00 | 00 | 00 | 00 | 00 | 00 | | 00 | 00 | 00 | | |

TABLE 14

| JOB# | Item # | Setting Item | | Setting Data |
|---|---|---|---|---|
| 4001 | 20 | Key Data In Input Data | Space | 01~13 | |
| | | | Digit Length | 01~13 | |
| | | Space Before Start of First Master Record | | 001~999 | | |
| | | Record Length of Master | | 001~999 | | |
| | | Beginning Digit of Key in Record | | 001~999 | | |
| | | Procession when not In Master | | 0:Error  1:Neglect | |

TABLE 15

| JOB # | Item # | Setting Item | | 1 | 2 | 3 | 4 | 5 | 6 | 7 | 8 | 9 | 10 |
|---|---|---|---|---|---|---|---|---|---|---|---|---|---|
| | | | | | | | | Title Item | | | | | |
| 4001 | 21 | Item Length | 01~24 | | | | | | | | | | |
| | | Edit. on Display | 0: X — X   1:Z — 9 | | | | | | | | | | |
| | | | 2:Z — 9.9   3:Z — 9.99 | | | | | | | | | | |
| | | Space before First Item | 001~999 | | | | | | | | | | |

TABLE 16

| | | | | NK2 | MRS | |
|---|---|---|---|---|---|---|
| $N_1 N_2$ | Key Data in Input Data | Position of Beginning Digit | | 01~13 | 00 | → Rs |
| $N_3 N_4$ | | Digit Length | | 01~13 | 00 | → Kl |
| $N_5 N_6 N_7$ | Master Memory | Position of Beginning Digit of First Record | | 001~999 | 000 | → s |
| $N_8 N_9 N_{10}$ | Format | Length of One Record | | 001~999 | 000 | → l |
| $N_{11} N_{12}$ | Position of | Starting Position in | | 001~999 | 000 | → Ks |
| $N_{13}$ | Key Data in Master Memory | One Record | | | | |
| $N_{14}$ | Error Procession (when no data found) | Error | | 0 | 0 | |
| | | Neglect | | 1 | | |

TABLE 17

| Data Output Fashion | | Setting of Decision of Proper Ending | Remarks |
|---|---|---|---|
| GPiO | GP4BTS (Parity System) | NO | Available for Data Registering Memory of 4 bit Regarded as Proper Ending when all data are output |
| | GP4BTS (Inverted Dual Forwarding System) | YES | Available for Data Registering Memory of 4 bit |
| | GP8BTS | YES | Available for Data Registering Memory of 8 bit |
| SiO | NO Procedure | YES | Available for Data Registering Memory of 8 bit |

TABLE 18

| Decision of Proper Ending | Type of Data | Ending Data | Remarks |
|---|---|---|---|
| NO | — | — | When all data output, regarded as Proper Ending |
| YES | 4 BiT | 30~39$_H$, 41$_H$, 43~45$_H$ (Set within 8 digits) | Only when host machine handed out the ending data set here, regarded as proper ending |
| | 8 BiT | 20~7F$_H$, A0~DF$_H$ (Set within 8 digits) | |

TABLE 19

| JOB# | Item# | Setting Item | | | | |
|---|---|---|---|---|---|---|
| 0001 | | Title | | | Character | |
| | 01 | Input Each character by HEX Input (20~7F, A0~DFH) | | | HEX | |
| | 02 | Buzzer on TPR Input | 0: Low when Valid OSB, High when Invalid LB | 1: No Sound when Valid. High when Invalid LB | | |
| | | Buzzer on 10 Key Input | 0: Low when Valid OSB, High when Invalid OSB | 1: No Sound when Valid. High when Invalid OSB | | B2 |
| | | Edition of Sign Code | | | | B1 |
| | | Data Format of Data Memory 0: 4BIT | | 1: 8BIT | | B0 |
| | | Existence of automatic Power off 0: None | | 1: Exist | | B3 |
| | | Power off during Entry 0: Impossible | | 1: Possible | | B2 |

TABLE 19-continued

| JOB# | Item# | Setting Item | | |
|---|---|---|---|---|
| | | Resume Point after Power ON 0: Service Selection | 1: Entry at Power Off | B1 |
| | | Memory clear after Power ON 0: Don't | 1: Do | B0 |
| | | Memory clear after Data output 0:Don't | 1: Do | B3 |
| | | CE Key on F Operation 0:Treat as ordinal CE Key | 1: Treat as CAN Key | B2 |
| | | Memory to Data Memory of Decimal Point 0:Not Memorize | 1: Memorize | B1 |
| | | Existence of Initial Registering Operation 0:None | 1: Exist | B0 |
| | | Existence of Service Selection Operation 0:Use as Data Entry wihtout It 2:Exist | | |
| | | Number of Digit of Service Identification Code 0~8 Digit 0:NO Service Identification Code | | |
| | | Clear Code on Data Deletion 4BIT Data:Use B(42H)Ordinally 8BIT Data:20~7F, A0~DFH | | |

TABLE 20

| JOB # | Item # | Setting Item | | Setting Data |
|---|---|---|---|---|
| 4101 | 07 | Service Selection Method | 0:Service Selection Key 1:10 Key Input | |
| Title | | Service Selection Key or | Service Selection Key: 01~20 | |
| of | | 10 Key Input | 10 Key Input: 01~99 | |
| Entry | | Data Entry Pattern | 00~12 | |
| | | Function Key 1 | Hard Cord (00~20) | |
| | | Function Key 2 | Hard Cord (00~20) | |
| | | Availability of memory Search | 0: Possible 1: Possible | |
| | | Validity/Invalidity of CAN Key | O: Invalid 1: Valid | |
| | 08 | Service Identification Code | Assign the number of digits set by System parameter 4BIT: 30~39, 41, 43~45$_H$ 8BIT: 20 7F, A0~DF$_H$ | |

What is claimed is:

1. Data input/output equipment being connected to a host machine for communication therewith, comprising:

processor means for controlling said data input/output equipment;

interface means, in electrical connection with said host machine and said processor means, for transmitting programs and data therebetween under control of said processor means;

mode setting means, in electrical connection with said processor means, for designating at least a program setting mode and an execution mode of said equipment;

program RAM means, in electrical connection with said processor means, for storing at least one basic program loaded from the host machine through said interace means;

parameter setting means, in electrical connection with said processor means, for designating parameters included in the basic program loaded in the program setting mode to define a plurality of application programs, each of which is available for a specified service;

parameter means, responsive to said paramter setting means, for memorizing parameters designated thereby;

data RAM means, in electrical connection with said processor means, for memorizing entry data provided by said processor means; and service selecting means, in electrical connection with said processor means, for designating one of said application programs in the execution mode;

wherein said parameter setting means includes means, in electrical connection with said processor means, for designating whether a sign or symbol contained in entry data should be memorized or not, and condition designation means, in electrical connection with said processor means, for designating a parameter corresponding to an entry condition which will enables a skipping of entry data relating to the entry condition of the entry data input in the program setting mode.

2. The data input/output equipment according to claim 1, wherein said application programs are programs designed for data entry jobs.

3. The data input/output equipment according to claim 1, further comprising:

display means, in electrical connection with said processor means, for displaying entry data; and scroll means, in electrical connection with said display means, for scrolling entry data displayed by said display means up or down;

said parameter setting means including means for designating whether entry data displayed by said display means should be scrolled up or down, said means for designating being in electrical connection with said processor means for designating scrolling conditions.

4. The data input/output equipment according to claim 1, wherein said parameter setting means includes check digit assignment means for assigning a check digit to each symbol included in the entry data so as to enable calculation of a total check digit number for the entry data including one or more symbols.

5. The data input/output equipment according to claim 1, wherein entry data preceding the entry data to be skipped is memorized in said data RAM means when the skip is done according to the conditions set by said condition designation means in the execution mode.

6. The data input/output equipment according to claim 1, wherein said parameter setting means includes data synthesis designation means, in electrical connection with said processor means, for designating whether two or more entry data items should be synthesized or not and for determining conditions for synthesizing or not and for determining conditions for synthesizing said entry data when said equipment is in the program setting mode.

7. The data input/output equipment according to claim 6, wherein said data synthesis means synthesizes the entry data with the memorized entry data entered prior thereto according to the designated conditions to develop synthesized data and the synthesized data is memorized as the entry data for the execution mode.

8. The data input/output equipment according to claim 1, wherein said parameter setting means includes transmission starting designation means, in electrical connection with said processor means, for designating whether or not the transmission of data by said interface means should be automatically started when all of data entry have been completed and for designating conditions concerning said data transmission in the program setting mode.

9. Data input/output equipment being connected to a host machine for communication therewith comprising:
   processor means for controlling said data input/output equipment;
   interface means, in electrical connection with said host machine and said processor means, for transmitting programs and data therebetween under control of said processor means;
   mode setting means, in electrical connection with said processor means, for designating at least a program setting mode and an execution mode of said equipment;
   program RAM means, in electrical connection with said processor means, for storing at least one basic program being loaded from the host machine;
   parameter setting means, in electrical connection with said processor means, for designating parameters included in the basic program loaded in the program setting mode to define a plurality of application programs, each of which is available for a specified service;
   parameter RAM means, responsive to said parameter setting means, for memorizing parameters designated thereby;
   data RAM means, in electrical connection with said processor means, for memorizing entry data provided said processor means; and
   service selecting means, in electrical connection with said processor means, for designating one of application programs in the execution mode;
wherein said parameter setting means includes means, in electrical connection with said processor means, for designating service identification codes in order to identify each group of records entered in each data entry job from other group of records and conditions with respect to the program setting mode.

10. The data input/output equipment according to claim 9, wherein said means for designating service identification codes automatically assigns the service identification code to a beginning portion of the data when said equipment is in the execution mode if the service identification code is designated when said equipment is in the program setting mode.

11. The data input/output equipment according to claim 1, further comprising:
    master file RAM means, in electrical connection with said processor means, for memorizing at least one master file comprised of a plurality of records, said each record including data for reference including one key data item.

12. The data input/output equipment according to claim 11, further comprising:
    display means, in electrical connection with said processor means, for displaying entry data; and
    search means, in electrical connection with said processor means, for searching the master file when a key data item is entered in the execution mode and for causing said display means to display each record having a key data item corresponding to the key data item entered in said execution mode.

13. The data input/output equipment according to claim 1, further comprising calculation means, responsive to said parameter setting means, for calculating a sum of check codes with respect to parameters stored in said parameter means.

14. The data input/output equipment according to claim 13, wherein the calculation by said calculation means is started when a power switch of said processor means is turned off.

* * * * *